United States Patent
Hohwald et al.

(10) Patent No.: US 11,176,189 B1
(45) Date of Patent: Nov. 16, 2021

(54) RELEVANCE FEEDBACK WITH FACETED SEARCH INTERFACE

(71) Applicant: SHUTTERSTOCK, INC., New York, NY (US)

(72) Inventors: Heath Hohwald, Logrono (ES); Kevin Lester, Summit, NJ (US)

(73) Assignee: Shutterstock, Inc., New York, NY (US)

( * ) Notice: Subject to any disclaimer, the term of this patent is extended or adjusted under 35 U.S.C. 154(b) by 377 days.

(21) Appl. No.: 15/394,773

(22) Filed: Dec. 29, 2016

(51) Int. Cl.
*G06F 16/51* (2019.01)
*G06F 16/58* (2019.01)

(52) U.S. Cl.
CPC .............. *G06F 16/51* (2019.01); *G06F 16/58* (2019.01)

(58) Field of Classification Search
CPC ......... G06F 17/30244; G06F 17/30247; G06F 17/3025; G06F 17/30253; G06F 17/30256; G06F 17/30259; G06F 17/30262; G06F 17/30365; G06F 17/30268; G06F 17/30271; G06F 17/30277; G06F 17/3028; G06F 16/50; G06F 16/51; G06F 16/53; G06F 16/532; G06F 16/535; G06F 16/538; G06F 16/54; G06F 16/55; G06F 16/56; G06F 16/58; G06F 16/583; G06F 16/5838; G06F 16/5846; G06F 16/5854; G06F 16/5862; G06F 16/5866; G06F 16/248; G06F 16/338; G06F 16/3326; G06F 16/332;
(Continued)

(56) References Cited

U.S. PATENT DOCUMENTS 7,099,860 B1 * 8/2006 Liu ........................ G06F 16/58
8,412,727 B1 * 4/2013 Das ................... G06F 16/90324
707/767
(Continued)

OTHER PUBLICATIONS

A. Kovashka, D. Parikh and K. Grauman, "WhittleSearch: Image search with relative attribute feedback," 2012 IEEE Conference on Computer Vision and Pattern Recognition, Providence, RI, 2012, pp. 2973-2980, doi: 10.1109/CVPR.2012.6248026. (Year: 2012).*
(Continued)

*Primary Examiner* — David T. Brooks
(74) *Attorney, Agent, or Firm* — McDermott Will & Emery LLP

(57) ABSTRACT

Various aspects of the subject technology relate to systems, methods, and machine-readable media for relevance feedback with faceted search interface. A system provides a first search query to an image search engine for initiating an image search, where the first search query indicates a first search term. The system obtains image metadata from an image collection, and obtains a listing of query refinement terms associated with the first search query from the query refinement data structure. The system determines a listing of search results containing images with one or more facets associated with the listing of query refinement terms. The system then receives user input indicating selection of at least one of the one or more facets of an image in the listing of search results. The system provides a second search query using the first search term and a second search term indicating the selected one or more facets.

20 Claims, 16 Drawing Sheets

(58) Field of Classification Search
CPC ............. G06F 16/3338; G06F 16/3322; G06F 16/3334; G06F 16/587; G06F 16/3328
See application file for complete search history.

(56) References Cited

U.S. PATENT DOCUMENTS

| | | | | |
|---|---|---|---|---|
| 8,515,985 | B1* | 8/2013 | Zhou | G06F 16/3325 707/767 |
| 8,645,409 | B1* | 2/2014 | Garg | G06F 16/3334 707/769 |
| 8,873,867 | B1* | 10/2014 | Alldrin | G06K 9/726 382/224 |
| 8,898,150 | B1* | 11/2014 | Kuramochi | G06F 16/58 707/722 |
| 9,020,926 | B1* | 4/2015 | Allon | G06F 16/3338 707/708 |
| 9,449,095 | B1* | 9/2016 | Panda | G06F 16/3338 |
| 9,594,540 | B1* | 3/2017 | Stasior | G06F 7/00 |
| 9,928,448 | B1* | 3/2018 | Merler | H05K 999/99 |
| 10,540,378 | B1* | 1/2020 | Hsiao | G06K 9/6256 |
| 2006/0294071 | A1* | 12/2006 | Weare | G06F 16/951 |
| 2009/0254539 | A1* | 10/2009 | Wen | G06F 16/583 |
| 2009/0292674 | A1* | 11/2009 | Dasdan | G06F 16/3322 |
| 2010/0205202 | A1* | 8/2010 | Yang | G06F 16/532 707/767 |
| 2011/0055238 | A1* | 3/2011 | Slaney | G06F 16/3331 707/759 |
| 2011/0060752 | A1* | 3/2011 | Lane | G06F 17/3064 707/766 |
| 2011/0125764 | A1* | 5/2011 | Carmel | G06F 16/3338 707/749 |
| 2011/0184950 | A1* | 7/2011 | Skaff | G06K 9/00664 707/737 |
| 2012/0011129 | A1* | 1/2012 | van Zwol | G06F 16/951 707/748 |
| 2012/0030152 | A1* | 2/2012 | Pueyo | G06Q 30/00 706/12 |
| 2012/0117051 | A1* | 5/2012 | Liu | G06F 16/43 707/707 |
| 2014/0019431 | A1* | 1/2014 | Suleyman | G06F 16/532 707/706 |
| 2014/0019484 | A1* | 1/2014 | Coppin | G06F 16/5838 |
| 2014/0032544 | A1* | 1/2014 | Mathieu | G06F 16/5866 707/728 |
| 2014/0046935 | A1* | 2/2014 | Bengio | G06F 16/338 707/723 |
| 2014/0181086 | A1* | 6/2014 | Wable | G06F 16/9535 707/722 |
| 2014/0201647 | A1* | 7/2014 | Scherpa | G06F 3/048 715/747 |
| 2015/0134688 | A1* | 5/2015 | Jing | G06F 16/5866 707/766 |
| 2015/0142787 | A1* | 5/2015 | Kimmerling | G06F 16/252 707/723 |
| 2015/0161173 | A1* | 6/2015 | Zhou | G06F 16/50 707/728 |
| 2015/0193528 | A1* | 7/2015 | Bengio | G06F 16/338 707/749 |
| 2015/0269231 | A1* | 9/2015 | Huynh | G06F 16/738 707/722 |
| 2015/0293942 | A1* | 10/2015 | Cady | G06F 16/532 707/722 |
| 2016/0026643 | A1* | 1/2016 | Desai | G06Q 10/10 707/727 |
| 2016/0203214 | A1* | 7/2016 | Chang | G06F 16/583 707/797 |
| 2016/0275376 | A1* | 9/2016 | Kant | G06K 9/6277 |
| 2017/0097948 | A1* | 4/2017 | Kerr | G06N 3/08 |
| 2017/0103072 | A1* | 4/2017 | Yuen | G06F 16/58 |
| 2017/0139954 | A1* | 5/2017 | Mei | G06F 16/532 |
| 2017/0236055 | A1* | 8/2017 | Lin | G06N 3/0472 706/20 |

OTHER PUBLICATIONS

Yee et al., "Faceted Metadata for Imsage Search and Browsing", CHI '03: Proceedings of the SIGCHI Conference on Human Factors in Computing SystemsApr. 2003 pp. 401-408https://doi.org/10.1145/642611.642681 (Year: 2003).*

* cited by examiner

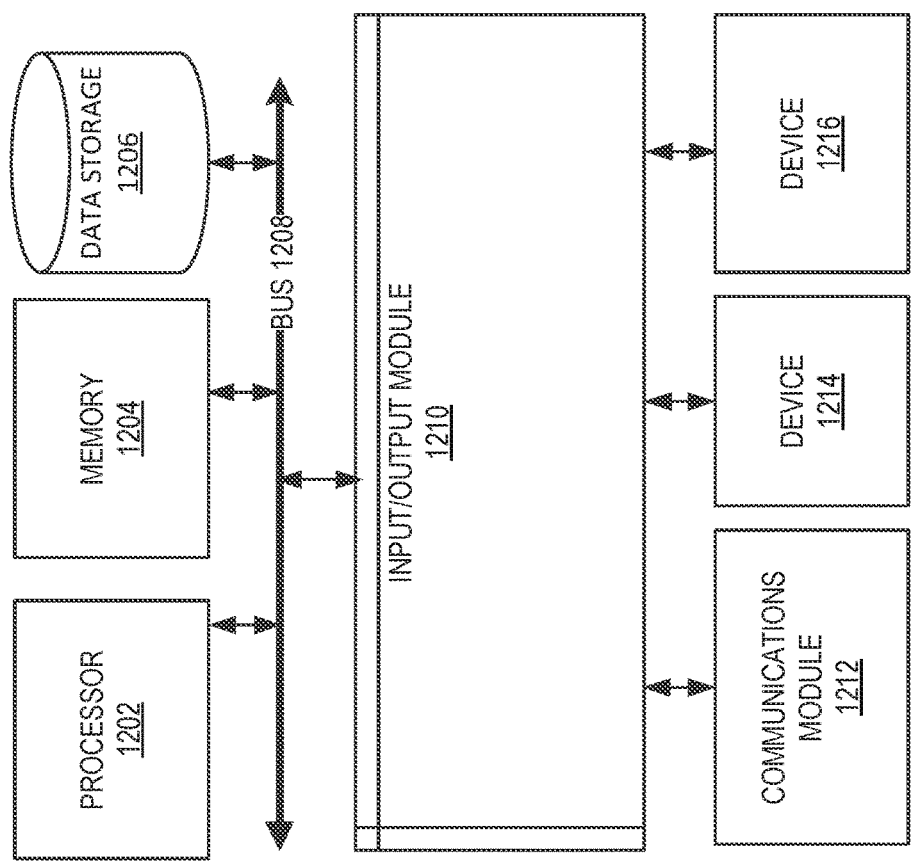

RELEVANCE FEEDBACK WITH FACETED SEARCH INTERFACE

BACKGROUND

Field

The present disclosure generally relates to a computer-based image retrieval system, and more particularly to relevance feedback with faceted search interface.

Description of the Related Art

When a user performs a search of a collection of images using a search query, an information retrieval (IR) system commonly matches a user's search terms with content items from the collection that are most relevant to a user's query. The problem of finding a desired multimedia item in a very large collection can be quite daunting. With potentially hundreds of millions of items, the task for a user of indicating to the IR system the item (e.g., image or images) that match the concept they have in mind is challenging. Expressing in keywords an abstract concept or finding adequate text to describe a visual conception can be beyond the ability of traditional IR systems to naturally support.

SUMMARY

In one or more implementations, the present disclosure provides for injecting dynamic facets into search results. For example, when a user selects an image to indicate it is a good result, the interface may provide the user an option of indicating which aspects of the image are good. The options indicated may be dynamic in that they are dependent on the particular query and search results. Once the user finishes providing feedback, the IR system then incorporates all feedback to provide a more precise set of results closer to what the user intended. In this respect, the disclosed system provides a first search query to an image search engine for initiating an image search, where the first search query indicates a first search term. The disclosed system obtains image metadata from an image collection, and obtains a listing of query refinement terms associated with the first search query from a query refinement data structure. The disclosed system determines a listing of search results containing images with one or more facets associated with the listing of query refinement terms. The disclosed system then receives user input indicating selection of at least one of the one or more facets of an image in the listing of search results. The disclosed system then provides a second search query using the first search term and a second search term indicating the selected one or more facets, where the second search query provides a modified listing of search results that is closer to what the user intended based on the received feedback indicating the facets of interest to the user.

According to one embodiment of the present disclosure, a computer-implemented method is provided. The method includes receiving user input identifying a search query for content from a client device, in which the search query indicates a first search term. The method includes providing a first set of search results to the client device based on the search query, the first set of search results including first images associated with the first search term from a collection of images. The method includes providing a user interface control with each of the first images, the user interface control providing one or more facets for the image, the one or more facets prompting a user to provide feedback with respect to the image. The method includes receiving an indication of the feedback via the interface from the client device. The method also includes providing a second set of search results to the client device based on the received indication of the feedback, in which the second set of search results include second images associated with a second search term based on the one or more facets. In one or more implementations, the second search term is a refinement to the first search term.

According to one embodiment of the present disclosure, a system is provided including one or more processors and a computer-readable storage medium coupled to the one or more processors, the computer-readable storage medium including instructions that, when executed by the one or more processors, cause the one or more processors to provide a first search query to an image search engine for initiating an image search, the first search query indicating a first search term. The system obtains image metadata from an image collection via the image search engine. The system then obtains a listing of query refinement terms associated with the first search query from a query refinement data structure. The system determines a listing of search results containing images with one or more facets associated with the listing of query refinement terms. The system receives user input indicating selection of at least one of the one or more facets of an image in the listing of search results. The system also provides a second search query to the image search engine using the first search term and a second search term indicating the selected at least one facet.

According to one embodiment of the present disclosure, a non-transitory computer readable storage medium is provided including instructions that, when executed by a processor, cause the processor to perform a method. The method includes providing a first search query to an image search engine for initiating an image search, in which the first search query indicates a first search term. The method includes obtaining image metadata from an image collection via the image search engine. The method includes obtaining a listing of query refinement terms associated with the first search query from a query refinement data structure. The method includes determining a listing of search results containing images with one or more facets associated with the listing of query refinement terms. The method includes receiving user input indicating selection of at least one of the one or more facets of an image in the listing of search results. The method also includes providing a second search query to the image search engine using the first search term and a second search term indicating the selected at least one facet.

According to one embodiment of the present disclosure, a system is provided that includes means for storing instructions; and means for executing the stored instructions that, when executed by the means, cause the means to perform a method. The method includes receiving user input identifying a search query for content from a client device, in which the search query indicates a first search term. The method includes providing a first set of search results to the client device based on the search query, in which the first set of search results include first images associated with the first search term from a collection of images. The method includes providing a user interface control with each of the first images, in which the user interface control provides one or more facets for the image, and the one or more facets prompt a user to provide feedback with respect to the image. The method includes receiving an indication of the feedback via the interface from the client device. The method also includes providing a second set of search results to the client device based on the received indication of the feedback, in which the second set of search results include second images associated with a second search term based on the one or more facets, and the second search term being a refinement to the first search term.

According to one embodiment of the present disclosure, a computer-implemented method is provided. The method includes receiving user input via an application on a client device, in which the user input indicates a request to initiate an image search. The method includes generating, in response to the received user input, an image search query including a first search term from the user input. The method includes providing for transmission the image search query over a connection to a server, in which the server includes an image search service that identifies one or more images responsive to the image search query. The method includes receiving a first set of search results based on the image search query, in which the first set of search results includes first images associated with the first search term from a collection of images. The method includes receiving a user interface control with each of the first images, in which the user interface control provides one or more facets for the image, and the one or more facets prompt a user to provide feedback with respect to the image. The method includes providing an indication of the feedback via the user interface control. The method also includes receiving a second set of search results based on the provided feedback, in which the second set of search results includes second images associated with a second search term based on the one or more facets, and the second search term is a refinement to the first search term.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 12 is a block diagram illustrating an example computer system with which the client and server of FIG. 2 can be implemented.

DETAILED DESCRIPTION

Figure 1:
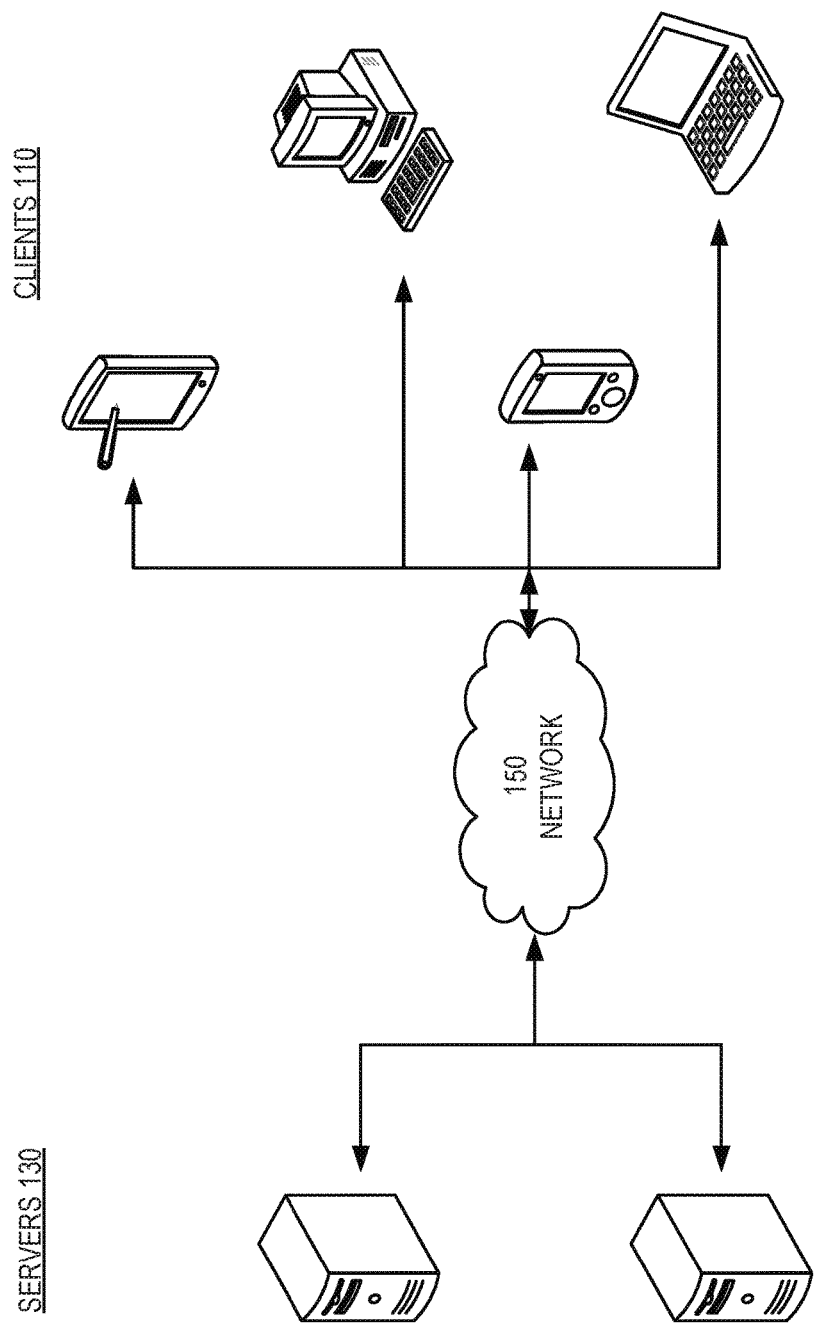
FIG. 1 illustrates an example architecture for content search by relevance feedback suitable for practicing some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and/or a label associated with an image for identifying the image. The term "facet" as used herein refers to a query refinement term that indicates a visual feature and/or object present in a corresponding search result image and is used as a form of relevant feedback input. As used herein, the term "search term" may refer to a word in a query or portion of a query comprised of a string of text, which may be a single term or multiple terms.

General Overview

While basic relevance feedback provides an opportunity for a user to provide feedback to the IR system, it can be restrictive in the nature of the feedback it supports because it only allows for binary feedback. Feedback the user can supply is only applied at the macro image level, not allowing for more fine-grained control in allowing the user to specify what aspects of the image may or may not match their intentions. Determining which aspects of an image are most appropriate for gathering more relevant feedback and deciding how to best present and incorporate more fine-grained feedback can be challenging.

Instead of having a user enter a text query and then presenting them with a static set of results, the present disclosure provides for the user to indicate through the interface what results are desirable and what are not. An arbitrary number of the initial search results can be tagged as being "good" or "bad" results for the image. Once a set of initial results are tagged, the IR system then incorporates that feedback to present a new, improved set of results, potentially iterating in successive manner, and each time presenting a set of search results that is more relevant to what the user was searching for.

The present disclosure provides for expanding the feedback users can provide about the relevance of returned results through exposure of dynamic facets in search results user interface. For example, a user may be searching for an image of a beach that includes sand, waves, sunshine, and beach towels. Providing a large list of keywords or textual description may be problematic due to conjunctive treatment of search terms or lack of proper metadata for images in the collection. In the basic relevance feedback, a user can issue a query for the term "beach" and then indicate which of the resultant search results are examples of "good" results, choosing as positive example images with most of the aspects they desire present in the image. In one or more implementations, the present disclosure provides for injecting dynamic facets into the search results. For example, when a user selects an image to indicate it is a good result, the interface may provide the user an option of indicating which aspects of the image are good. In this example, knowing the query is beach, upon interacting with the image (e.g., clicking on image) a dynamic facet may appear that asks "This image is a good result because it includes" followed by checkboxes next to the terms: a) waves, b) sand, c) sunshine, d) sea shells, e) beach towels. The user may then indicate all but option d) by clicking the check boxes. The options indicated here are dynamic in that they are dependent on the particular query and search results. Once the user finishes providing feedback, the IR system then incorporates all feedback to provide a more precise set of results closer to what the user intended.

In one or more implementations, if object recognition is applied to images, the user interface is adapted to not only show textual facets but to allow a user to click on the regions of an image that they are most interested in and that best matches the user's intention. For example, an image of a beach can be segmented to isolate the sand, the waves, and a beach towel. The user can then directly click on those regions of the image and directly indicate that the region is in agreement or not with that user's intentions, thereby enhancing the search experience with more visually driven interactions.

The disclosed system addresses a problem in the traditional IR systems with basic relevance feedback, the restrictive nature of feedback supported, which is a problem specifically arising in the realm of computer technology, by providing a solution also rooted in computer technology, namely, by considering a search engine system using an object classifier for classifying salient objects in images using query refinements of search queries. The object classifier can classify the strength with which an image exhibits certain known objects. The system may use an algorithm that detects the set of objects from a set of example images, referred to as training data. The disclosed system includes training of a series of computer-operated neural networks, such as a convolutional neural network, to teach the neural network to identify features of images mapping to certain object classes for identifying those images that are responsive to an input search query with a probability that the images are deemed relevant to the input search query. In certain aspects, the convolutional neural network is operated on a server and accesses large amounts of image data stored in memory of the server or stored elsewhere and accessible by the server in order to train the convolutional neural network.

A set of training images may be provided to the convolutional neural network in order to teach the convolutional neural network to identify features of a training image, and then process those features against a number of object classes. The disclosed system produces a set of vectors representing the object classifications for the corpus of images in the training data. The objects are learned from running the convolutional neural network over a corpus of the training data. The trained convolutional neural network can provide a probability distribution where each data point in the distribution corresponds to a likelihood that the image includes a corresponding object. The disclosed system determines the probability that such training image contains a salient object based on probabilistic computations per object class for that training image. Once the convolutional neural network has been trained to predict probabilistically which features of the training images identify certain object classes, the disclosed system generates metadata for each example image indicating the salient object for user interaction. In this respect, the disclosed system can then modify the original search query by adding refinement terms that represent the salient objects selected by the user deemed as "good" or "positive" results.

The subject system provides several advantages including providing classified objects that prompt real-time feedback for filtering through content that is most relevant to a user's search query. The system provides a machine learning capability where the system can learn from a content item and associated objects in order to refine search results with highly relevant content items. In this regard, the refined search results would yield content items with features that closely resemble the salient objects identified as in agreement with the user's intentions so that the user can select a content item that is determined to have a highly relevant appearance. With this approach, the system can continually improve its accuracy (and keep up with trending differences of what certain salient objects look like) by incorporating relevant feedback into its convolution-based object recognition model. By presenting results to the user, identifying the media that a user interacts with and/or approves (indicating positive results), and examining the results that a user ignores and/or disapproves (indicating negative results), the system can continually learn and refine itself to match user preferences.

The disclosed system further provides improvements to the functioning of the computer itself because it saves data storage space, reduces system loading times and reduces the cost of system resources. Specifically, the computer hosting the collection of images to be searched is not required to maintain in data storage or repeatedly share over a network with the convolutional neural network classification information based on the trained images to be searched because the convolutional neural network, once trained, is configured to predict which features of the images in the collection of images correlate to particular object classes. At runtime, the modified search query produces a smaller search space that includes images that are most relevant to the user's intentions based on the feedback received with respect to the original search results, thus reducing the cost of images provided for display (i.e., less bandwidth resources). Given that the subject system continues to learn and refine itself to match user preferences from a search query, modifying search results in real-time to include a more precise listing of images reduces the system load due to a lesser number of searches needed to reach a search result that matches the user's intentions.

Although many examples provided herein describe a user's search inputs being identifiable (e.g., a user's search history identifying the user's interactions with images from a search result), or download history for images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Example System Architecture

FIG. 1 illustrates an example architecture 100 for content search using relevance feedback suitable for practicing some implementations of the disclosure. The architecture 100 includes servers 130 and clients 110 connected over a network 150. One of the many servers 130 is configured to host a computer-operated neural network. The neural network, which can be a convolutional neural network, is trained to identify features of images corresponding to one or more image identifiers. One of the many servers 130 also hosts a collection of images. The collection of images can be searched using an image search engine (e.g., accessible through a web page on one of the clients 110). Images from the collection can also be used to train the neural network to identify features of the images and, with the addition of data indicating one or more objects, once identified, are likely to indicate whether the image contains one or more salient objects. The servers 130 can return images tagged with metadata indicating one or more salient objects to the clients 110 in response to a search query for prompting a user to interact with the objects and obtaining relevance feedback based on the user interaction. For purposes of load balancing, multiple servers 130 can host the neural network and multiple servers 130 can host the collection of images.

The servers 130 can be any device having an appropriate processor, memory, and communications capability for hosting the neural network, the collection of images, and the image search engine. The image search engine is accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Example Relevance Feedback System

Figure 2:
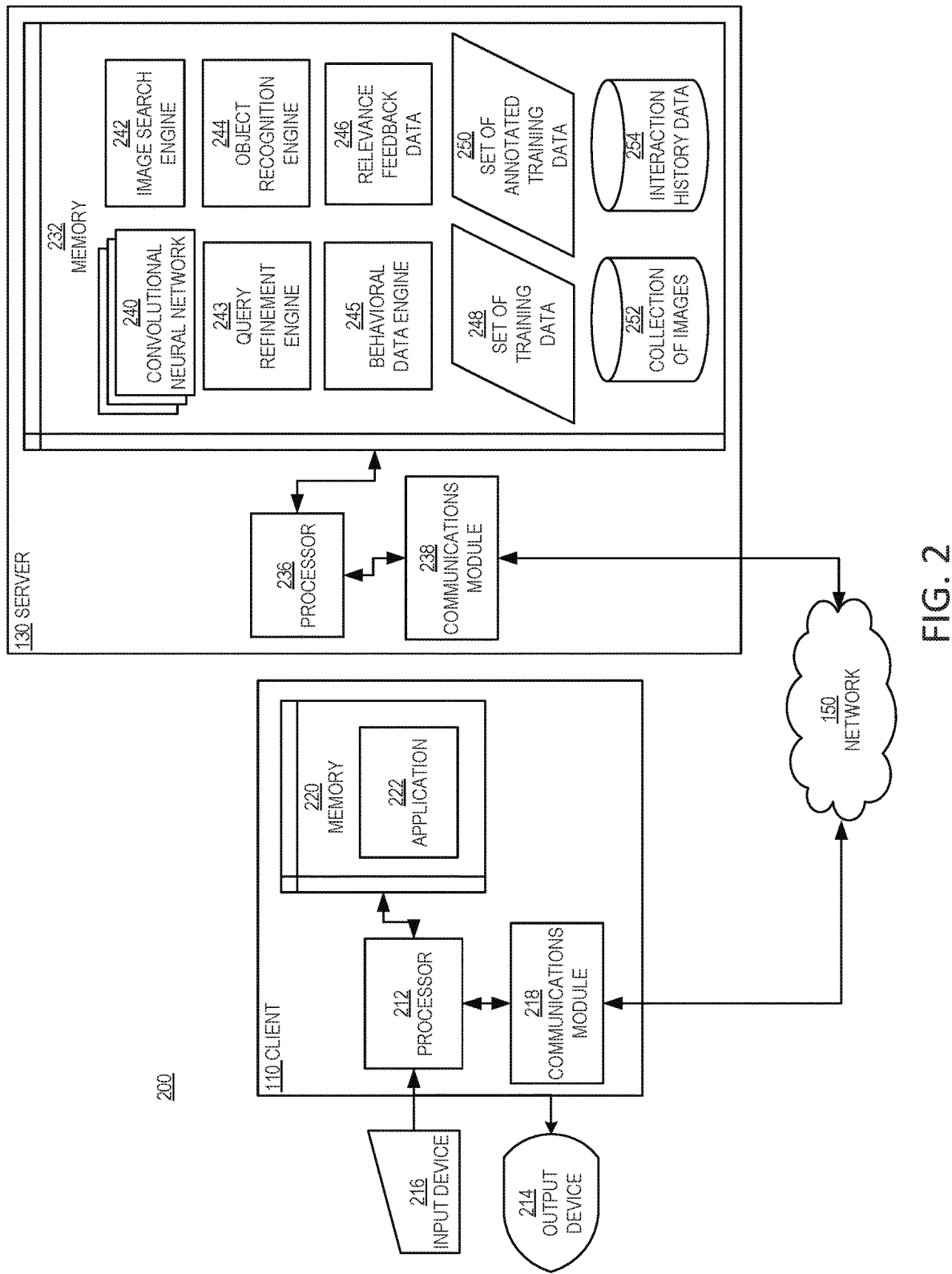
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes a convolutional neural network 240, an image search engine 242, a query refinement engine 243, an object recognition engine 244, and a behavioral data engine 245.

In one or more implementations, the convolutional neural network 240 may be a series of neural networks, one neural network for each object classification. As discussed herein, a convolutional neural network 240 is a type of feed-forward artificial neural network where individual neurons are tiled in such a way that the individual neurons respond to overlapping regions in a visual field. The architecture of the convolutional neural network 240 may be in the object of existing well-known image classification architectures such as AlexNet, GoogLeNet, or Visual Geometry Group models. In certain aspects, the convolutional neural network 240 consists of a stack of convolutional layers followed by several fully connected layers. The convolutional neural network 240 can include a loss layer (e.g., softmax or hinge loss layer) to back propagate errors so that the convolutional neural network 240 learns and adjusts its weights to better fit provided image data.

The memory 232 also includes a collection of images 252. In one or more implementations, the collection of images 252 represents a database that contains, for each image, a mapping from an image identifier to a data file containing pixel data for the image (e.g., in jpeg format). The collection of images 252 can be, for example, a dataset of trained images corresponding to an arbitrary number of object classes. Each of the images may include an indication of one or more salient objects present in the image based on the corresponding object classes applicable to the image. The images may be paired with image vector information and image cluster information. The image vector information identifies vectors representing a large sample of images (e.g., about 50 million) and the image cluster information identifies the vectors in one or more clusters such that each of the cluster of images represents a semantic concept. In one or more implementations, the collection of images 252 includes a dataset for each image, where the dataset indicates an array of pixel values for each color channel (e.g., red, blue, green) of the image. The array of pixel values may include an integer value in a range of 0 to 255 for each pixel, where the value indicates how dark a corresponding pixel location should be.

Also included in the memory 232 of the server 130 is a set of training data 248. The set of training data 248 can be, for example, a dataset of content items (e.g., images) corresponding to an arbitrary number of object classes with a predetermined number of content items (e.g., about 10,000 images) per object class. The set of training data 248 may include multiple instances (or sets) of training data, where one instance (or set) of training data is associated with an intended object class and another instance (or set) of training data is not associated with the intended object class. For example, the set of training data 248 may include images that include features that represent a beach and images that include features that represent something other than a beach so that a convolutional neural network can be trained to distinguish between images with a beach feature and images without a beach feature. The set of training data 248 also may include image vector information and image cluster information, in which the image vector information identifies training vectors representing a large sample of training images and the image cluster information identifies clusters representing respective semantic concepts. In this respect, the vectors corresponding to a semantic concept (e.g., beach) are clustered into one cluster representing that semantic concept. In one or more implementations, there are a predetermined number of object classes (e.g., sand, waves, beach towel) that corresponds to one semantic concept (e.g., beach).

Although the set of training data 248 is illustrated as being separate from the collection of images 252, in certain aspects the set of training data 248 is a subset of the collection of images 252. Furthermore, although the collection of images 252 and the image search engine 242 are illustrated as being in the same memory 232 of a server 130 as the convolutional neural network 240, in certain aspects the collection of images 252 and the image search engine 242 can be hosted in a memory of a different server but accessible by the server 130 illustrated in FIG. 2.

The memory 232 also includes a set of annotated training data 250. The set of annotated training data 250 may be targeted data gathered via textual-based dynamic facets and/or segmented images with corresponding dynamic facets. The set of annotated training data 250 may include images from the collection of images 252 that are human annotated with information indicating which images are good results and/or which aspects of an image are good according to a user that judged the image via the dynamic facets presented for display with at least one image of a search result. The set of annotated training data 250 may be utilized to further refine the training of the convolutional neural network 240.

The query refinement engine 243 may be a module executed by the processor 236 that is configured to mine through session logs for identifying common query refinements for a given search query. The query refinement engine 243 may be configured to obtain the session logs and search through the sessions logs for a predetermined query refinement or a list of query refinement terms (e.g., "beach"=>"beach sand"). The query refinement engine 243, when executed by the processor 236, can build and/or compile an index of highest probability query refinements per search query. For example, the query refinement engine 243 may construct a data structure, such as a table, that has entries such as "beach" and query refinement terms such as "sand", "waves", "sunshine", "sea shells", and "towel". In one or more implementations, the query refinement data structure is stored in the memory 232, and accessible to the processor 236 and the query refinement engine 243.

The object recognition engine 244 may be a module executed by the processor 236 that is configured to identify the most salient and prominent objects in an image and their location within the image using the convolutional neural network 240. For example, the object recognition engine 244 can tag an image of a "beach" with regions for "beach", "sand", and "towel". In one or more implementations, the object recognition engine 244 mines (or searches through) the user session logs, and identifies the top N most popular search queries, where N is a positive integer value. In one or more implementations, the object recognition engine 244 determines a predetermined number of search queries, where each search query from the predetermined number of search queries includes a query interaction frequency that exceeds a query popularity threshold. In one or more implementations, the object recognition device 244 determines the most popular S search results for each query Q, where Q and S are positive integer values. In one or more implementations, the object recognition engine 244 determines a predetermined number of images, where each image from the predetermined number of images includes an image interaction frequency that exceeds an image popularity threshold. In one or more implementations, the object recognition engine 244 iterates over the S search results and constructs a list of the most frequent objects in the set S for each query Q. In one or more implementations, the object recognition engine 244 adds a record to the data structure (e.g., table) that contains the list of the most frequent objects, where each key is a common query and each value in the data structure. Entries in the list may contain an object name and the coordinates locating the object in the image, which may be used to overlay a user interactive region in the image).

The memory 232 also includes relevance feedback data 246 indicating which facets of the search result were selected most for a given query. The relevance feedback data 246 may indicate which textual facets were selected in some embodiments, and which segments of an image were selected in other embodiments. In some aspects, the processor 236, using the relevance feedback data 246, can tag each of the images in the collection of images 252 with metadata identifying a salient object and its location in the image. The tagging can serve as an indication of an association between a salient object in the image and one or more object classes. The metadata may be a metadata file stored as a flat document or an index identifying a storage location in the collection of images 252. For example, the metadata file may include one or more rows of data including an image identifier, an image URL and an object identifier (e.g., identifying the corresponding object class).

The behavioral data engine 245 may be a module executed by the processor 236 that is configured to monitor (and/or track) user interactions with the search results from the image search engine 242. At runtime, the behavioral data engine 245 may facilitate incorporation of the gathered feedback by logging each occurrence of the query, image, facet shown, and facet selected. The behavioral data engine 245 may keep track of the frequency that a certain facet is selected or which facets are commonly selected.

The memory 232 also includes interaction history data 254. In certain aspects, the processor 236 is configured to determine the interaction history data 254 by obtaining user interaction data identifying interactions with images from image search results that are responsive to search queries. In this respect, the search results may be personalized based on the dynamic facets of the most-recent images downloaded or clicked by the user. For example, the processor 236 may determine that a user interacted with an image from a search result such as by clicking on a segment (or region) of the image to provide relevant feedback, saving the image for subsequent access, or downloaded the image to a client (e.g., client 110), or the like. The processor 236 may keep track of the user interactions with a number of images over a given time period. In one or more implementations, the processor 236 may track the learned facets of the last N images that the user interacted with as well as a current user query, where N is a positive integer value. The interaction history 254 may also include data indicating search behavior (and/or patterns) relating to prior image search queries.

The processor 236 of the server 130 is configured to execute instructions, such as instructions physically coded into the processor 236, instructions received from software in memory 232, or a combination of both. For example, the processor 236 of the server 130 executes instructions to submit a plurality of training images containing content identifying different semantic concepts (e.g., beach, apple) to the convolutional neural network 240 that is configured to analyze image pixel data for each of the plurality of training images to identify features, in each of the plurality of training images, corresponding to a particular semantic concept and receive, from the convolutional neural network 240 and for each of the plurality of training images, an identification of one or more object classes corresponding to the image processed by the convolutional neural network 240.

In certain aspects, the processor 236 of the server 130 is configured to receive a user input from a user. The user input identifies a search query in a given natural language. For example, the search query may be entered as an English term. A user of the client 110 may use the input device 216 to submit a search term or phrase via a user interface of the application 222. The user interface may include an input section where the search term or phrase may be typed in, for example. The input section may include one or more controls to allow the user to initiate the image search upon receiving the search query. In some aspects, the image search may be initiated automatically upon receiving at least one search term (or at least the search phrase in part). As described herein, the natural languages used are not limited to English, and the number of natural languages can vary to include other natural languages depending on implementation.

The search query is then provisioned to the image search engine 242 for initiating the image search through the collection of images 252. The user input is provided, for example, by the user accessing the image search engine 242 over the network 150 using the application 222 in the memory 220 on the client 110 of the user, and the user submitting the user input using the input device 216 of the client 110. For example, the user may use the input device 216 to enter the text-based search term or phrase. In response to the user input via the application 222, a processor of the client 110 is configured to transmit the search query over the network 150 using the communications module 218 of the client 110 to the communications module 238 of the server 130.

The processor 236 of the server 130, upon receiving the search query for the image search engine 242, is configured to submit a search request for the search query to the image search engine 242. In one or more implementations, the image search engine 242, using the query refinement engine 243, mines the user session logs and determines which facets have been selected the most for a given search query. The image search engine 242 can update the original search query by adding query refinement terms that represent the most popular search queries from the most polar images for each search query. The processor 236, using the object recognition engine 244, can find the salient objects based on the facet terms for a given search query. For example, the image search engine 242 promotes the facets that are more often chosen based on the frequency that the associated query term appears in the user session logs.

The processor 236 then receives an identification of a plurality of images from the collection of images 252 that are responsive to the search query, and is configured to provide an initial listing of images with the dynamic facets for prompting the user to identify which images are good or bad results. The initial listing of images may be prioritized (or ranked) according to the user interaction probabilities is provided, for example, by the processor 236 of the server 130 being configured to submit a set of training images (e.g., the set of training data 248, the set of annotated training data 250) to the convolutional neural network 240 prior to the search query being received. The processor 236 may then provide the initial listing of images to the application 222 on the client 110 over the network 150 for display by an output device 214 of the client 110.

The processor 236, using the relevance feedback data 246, can incorporate the feedback to generate new search results. In one or more implementations, the processor 236, using the image search engine 242, adds a textual description of the selected facets to the original search term. For example, the original search query included the query term "beach", and the facet the user selected is "sand". In this respect, the image search engine 242 can return a new set of search results for the new query term "beach sand". In one or more implementations, weights may be applied to both the original query term and the facet terms. In some embodiments, the facet terms are weighted lower than the original query term (e.g., "beach"=>1.0, "sand"=>0.75). In one or more implementations, facet terms that are selected as good results are weighted more than facet terms that are deselected, non-selected or indicative of a bad result. In one or more implementations, the weights are learned through an iterative supervised learning process, where online learning of the weights is correlated to success events such as downloads associated with particular weights. In some aspects, multi-armed bandits may be implemented to facilitate the learning of weights for facet terms.

Figure 3A:
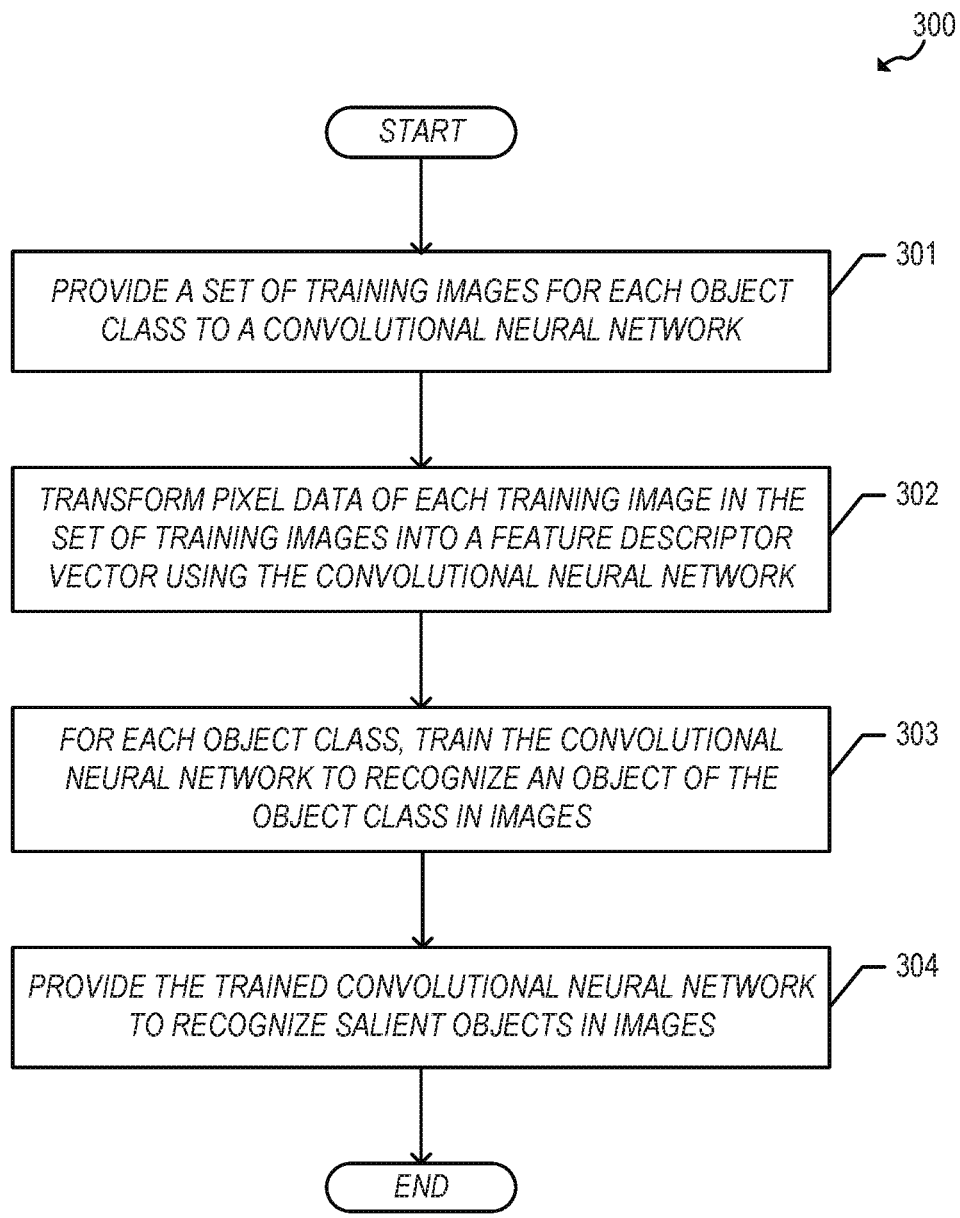
FIG. 3A illustrates an example process of training a convolutional neural network for object recognition using the example server of FIG. 2.

FIG. 3A illustrates an example process 300 of training a convolutional neural network for object recognition using the example server of FIG. 2. While FIG. 3A is described with reference to FIG. 2, it should be noted that the process steps of FIG. 3A may be performed by other systems.

The process 300 begins by proceeding from start step to step 301 when a set of training data 248 (e.g., training images) is fed through a convolutional neural network 240. For example, the convolutional neural network 240 can consist of a stack of eight layers with weights, the first five layers being convolutional layers and the remaining three layers being fully-connected layers. The set of training data 248 can be fixed-size 242×242 pixel Black-White image data or Red-Green-Blue (RGB) image data. In one or more implementations, the set of training data 248 includes a data file containing pixel data for each training image. The set of training data 248 may include a different set of training images for each object class. For example, the set of training data 248 may include a first set of training images representing a first object class (e.g., beach), and a second set of training images representing a second object class (e.g., apple). The number of sets (or instances) of the training data included in the set of training data 248 may be an arbitrary number and may vary depending on implementation.

Subsequently, in step 302, the convolutional neural network 240 transforms pixel data of each training image in the set of training images into a feature descriptor vector. For example, the convolutional neural network 240 extracts feature descriptors from the training images. The convolutional neural network 240 processes the set of training data 248 in order to learn to identify a correlation between an image and an object classification by analyzing pixel data of the image. Training with the set of training data 248 may be regularized by weight decay and dropout regularization for the first two fully-connected layers with a dropout ratio set to 0.5, and the learning rate may initially be set to $10^{-2}$ and then decreased by a factor of 10 when validation set accuracy stops improving for the convolutional neural network 240. The feature extraction algorithm executed by the convolutional neural network 240 may be implemented with three fully connected layers of the convolutional neural network 240.

Next in step 303, for each object class, the convolutional neural network 240 is trained to recognize an object of the object class in images. The convolutional neural network 240 may be trained to identify the most salient objects and their location within an image. In one or more implementations, relevance feedback operations are performed to find optimal values for the object classifier. For example, a set of annotated training images is input back into the object classifier to produce a refined distribution of object probability values across the set of object classes to determine a more accurate object (or objects) the image most likely represents. Next in step 304, the trained convolutional neural network 240 is provided to recognize salient objects in images at runtime. The process 300 to produce a single object classifier ends following step 304.

Figure 3B:
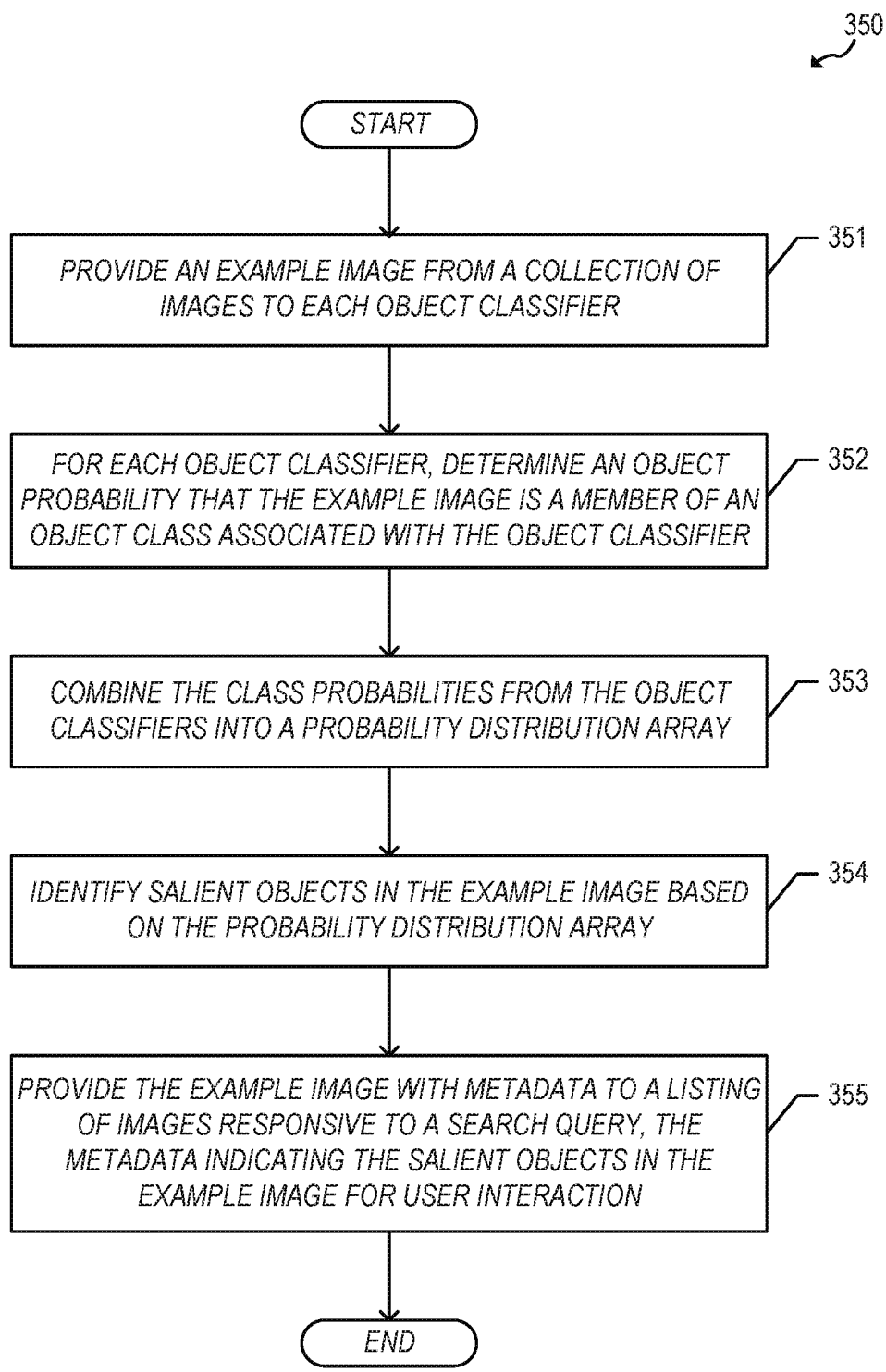
FIG. 3B illustrates an example process of identifying salient objects in example images using the example server of FIG. 2.

FIG. 3B illustrates an example process 350 of identifying salient objects in example images using the example server of FIG. 2. While FIG. 3B is described with reference to FIG. 2, it should be noted that the process steps of FIG. 3B may be performed by other systems. The process 350 begins by proceeding from start step to step 351 when an example image from the collection of images 252 is fed through each of the object classifier models to determine respective object probabilities for each object class.

Next, in step 352, for each object class, the object classifier determines an object probability that the example image is a member of that object class. Each of the probability values indicates the likelihood that an image, or at least in part an image feature, is a member of a subject object class based on pixel data of the image. In one or more implementations, an identifier such as a tag or a label associated with the example image may be used by the object classifier to determine the degree of association between the example image and the subject object class. Subsequently, in step 353, the object probabilities from the object classifiers are combined together into a probability distribution array. In one or more implementations, the probability distribution array represents a two-dimensional probability waveform, where the x-dimension refers to the compiled object classes and the y-dimension refers to probability values corresponding to the respective object classes.

In step 354, the subject system identifies salient objects in the example image based on the probability distribution array. In one or more implementations, the subject system provides an object name and the coordinates locating the salient object in the image. Based on the query refinement data from the user session logs, certain salient objects for each image are identified based on the learned facets that correspond to a user's search query. Next, in step 355, the subject system provides the example image with metadata to a listing of images responsive to a search query. In one or more implementations, the metadata indicates the salient objects in the example image for user interaction. In some embodiments, the metadata includes information with respect to the segmentation of the image such that one or more regions representing respective salient objects are indicated within the image.

Figure 4A:
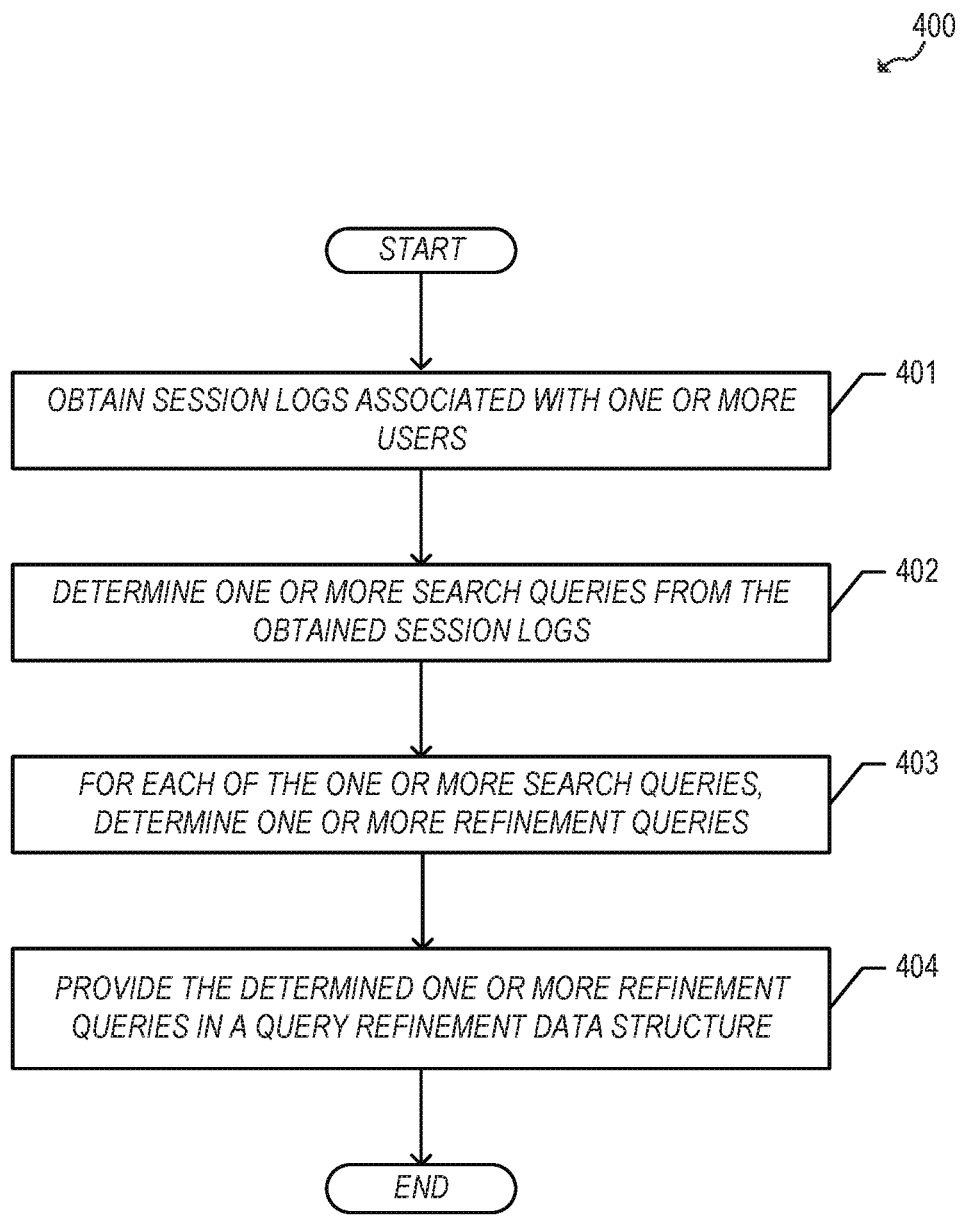
FIG. 4A illustrates an example offline process of compiling a list of query refinement terms using the example server of FIG. 2.

FIG. 4A illustrates an example offline process 400 of compiling a list of query refinement terms using the example server of FIG. 2. While FIG. 4A is described with reference to FIG. 2, it should be noted that the process steps of FIG. 4A may be performed by other systems.

The process 400 begins by proceeding from start step to step 401 when session logs associated with one or more users are obtained. In one or more implementations, the user session logs are a listing of search queries associated with one or more users initiated over time. Next, in step 402, the subject system determines one or more search queries from the obtained session logs. For example, the user session logs may indicate a user identifier, the search query and timestamp in a table listing. In the table listing, the user identifier in a first column may indicate users A, B and C. User A may indicate prior search queries that included the terms "beach" and "beach sand". In this example, the term "sand" is an added refinement term to the original search term query "beach". Similarly, user B may indicate prior search queries that included the terms "apple" and "apple basket", where "basket" is the added refinement term. User C may indicate prior search queries that included the terms "beach" and "beach waves", where "waves" is the added refinement term.

Subsequently, in step 403, for each of the one or more search queries, the subject system determines one or more refinement queries. For example, the search query "beach" includes refinement terms "sand" and "waves", and the search query "apple" includes the refinement term "basket". In step 404, the subject system provides the determined one or more refinement queries in a query refinement data structure. For example, these refinement terms may be compiled into a table listing to form the query refinement data structure. In the query refinement data structure, each of the learned facets (e.g., sand, waves) may be indexed by the corresponding search query term (e.g., beach).

Figure 4B:
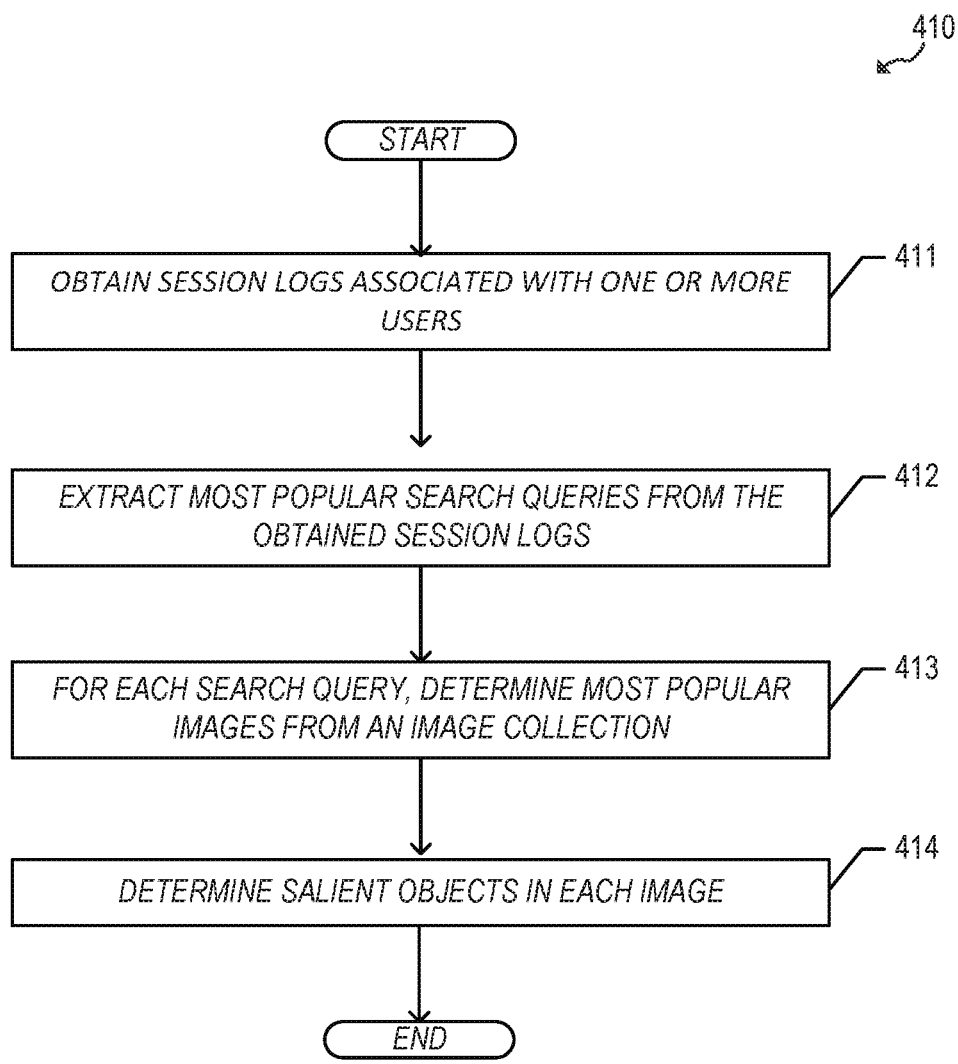
FIG. 4B illustrates an example offline process of identifying salient objects for respective search queries using the example server of FIG. 2.

FIG. 4B illustrates an example offline process 410 for identifying salient objects for respective search queries using the example server of FIG. 2. While FIG. 4B is described with reference to FIG. 2, it should be noted that the process steps of FIG. 4B may be performed by other systems.

The process 410 begins by proceeding from start step to step 411 when sessions logs associated with one or more users are obtained. Next, in step 412, the subject system extracts the most popular search queries from the obtained session logs. In one or more implementations, the subject system determines the number of instances that a certain search query appears in the user session logs to determine whether that search query exceeds a predetermined threshold to be considered a popular search query. The extracted most popular entries may be organized by query term including an indication of the frequency that the search query appeared in the user session logs. For example, the query term "beach" may have a frequency of about 100, the query term "apple" may have a frequency of about 50, etc.

Subsequently, in step 413, for each search query, the subject system determines the most popular images from an image collection. In one or more implementations, metadata associated with the images is used to index each image by its corresponding image identifier. The image identifier may include a keyword that corresponds to the search query term. In step 414, the subject system, using the object recognition engine 244, determines salient objects in each image. In one or more implementations, the identified salient objects indicate which facet terms are applicable to the subject image. In this respect, metadata indicating the applicable facet terms can be included into the image. The applicable facet terms for each given search query may be compiled into a table listing for data management and processing. For example, the search query term "beach" may be mapped with the facet terms "towel", "sand", and "waves", whereas the search query term "apple" may be mapped with the facet terms "basket" and "red". These facet terms may be provided for display alongside a corresponding search result image for user interaction and feedback.

Figure 4C:
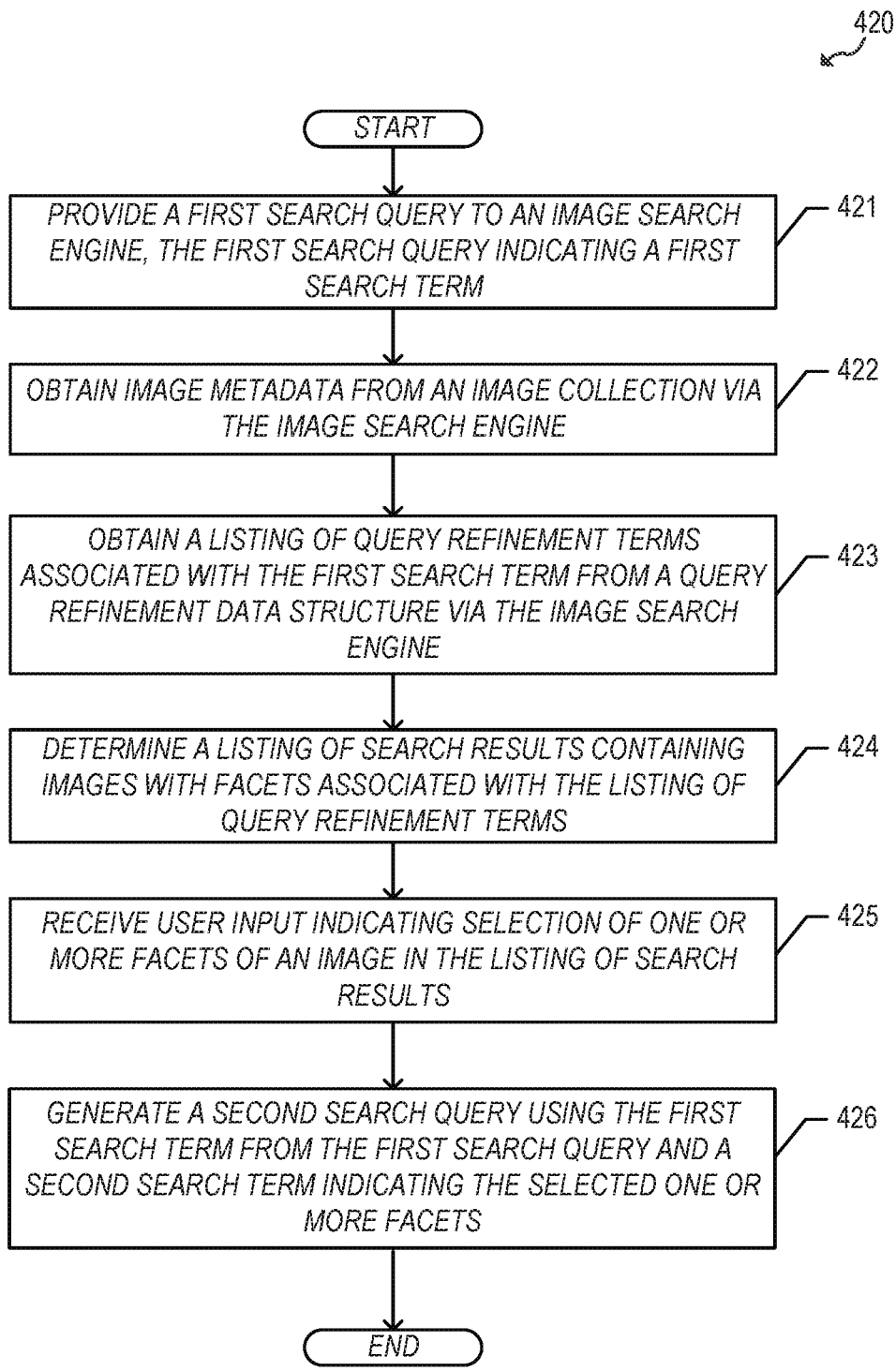
FIG. 4C illustrates an example runtime process of generating search results based on incorporated relevant feedback using the example server of FIG. 2.

FIG. 4C illustrates an example runtime process 420 of generating search results based on incorporated relevant feedback using the example server of FIG. 2. While FIG. 4C is described with reference to FIG. 2, it should be noted that the process steps of FIG. 4C may be performed by other systems.

The process 420 begins by proceeding from start step to step 421 when a first search query is provided to an image search engine. In one or more implementations, the first search query indicates a first search term. In FIG. 4C, the first search term may be the term "beach".

Next, in step 422, the subject system obtains image metadata from an image collection (e.g., 252) via the image search engine. The image metadata may include a keyword that corresponds to the term "beach", such that images tagged with the same keyword may be indexed and retrieved from the image collection.

Subsequently, in step 423, the subject system obtains a listing of query refinement terms associated with the first search term from a query refinement data structure via the image search engine. The query refinement data structure may be searched using the term "beach" as an index to entries that include the term "beach". In this respect, the associated refinement terms from each entry can be retrieved for processing. For example, the facet terms "towel", "sand" and "waves" can be used to prompt a user for feedback as to whether these facets are reasons that a corresponding image is a good or bad result.

In step 424, the subject system determines a listing of search results containing images with facets associated with the listing of query refinement terms. The listing of search results may include images related to a common semantic concept (e.g., beach) with different variations. The dynamic facets provided for display alongside the images from the listing of search results can facilitate filtering down the listing to identify a subset of images that are more consistent with the user's intentions. In one or more implementations, the facets are an overlay overlapping at least a portion of the image with an input field to mark the image as a good result (e.g., by a checkmark) or a bad result (e.g., by an X marking). In one or more implementations, the facets include both the overlay for marking the image and a textual-based listing of the facet options for user interaction. For example, the user may select one or more of the facet options to indicate which facets are reasons that make the image a good result or make the image a bad result. In one or more implementations, the facets may be represented as segmented regions within the image for user interaction. For example, features of the image may be emphasized (e.g., an outline around the pixels that illustrate beach waves), and the image may include a user interaction control that enables a user to select the feature of the image and translate that selection as an input to denote a good result or a bad result.

Next, in step 425, the image search engine receives user input indicating selection of one or more facets of an image in the listing of search results. The subject system can translate (or map) the selection of the one or more facets into the corresponding facet terms. For example, selection of a feature within the image that represents beach waves can be mapped to the facet term "waves" stored in the query refinement data structure for the given search query term "beach". In step 426, the subject system generates a second search query using the first search term from the first search query and a second search term indicating the selected one or more facets. In one or more implementations, the second search term is the facet term from the query refinement data structure that maps to the selected image facet. In one or more implementations, the first search term is a query or a portion of a query and the second search term is an additional string of text in the query, which may be a single term or multiple terms. For example, "white beach" may be the initial query (or first search term) and "red towel" may be the second query (or second search term) to add to the overall search query, but both may consist of multiple terms.

Figure 5A:
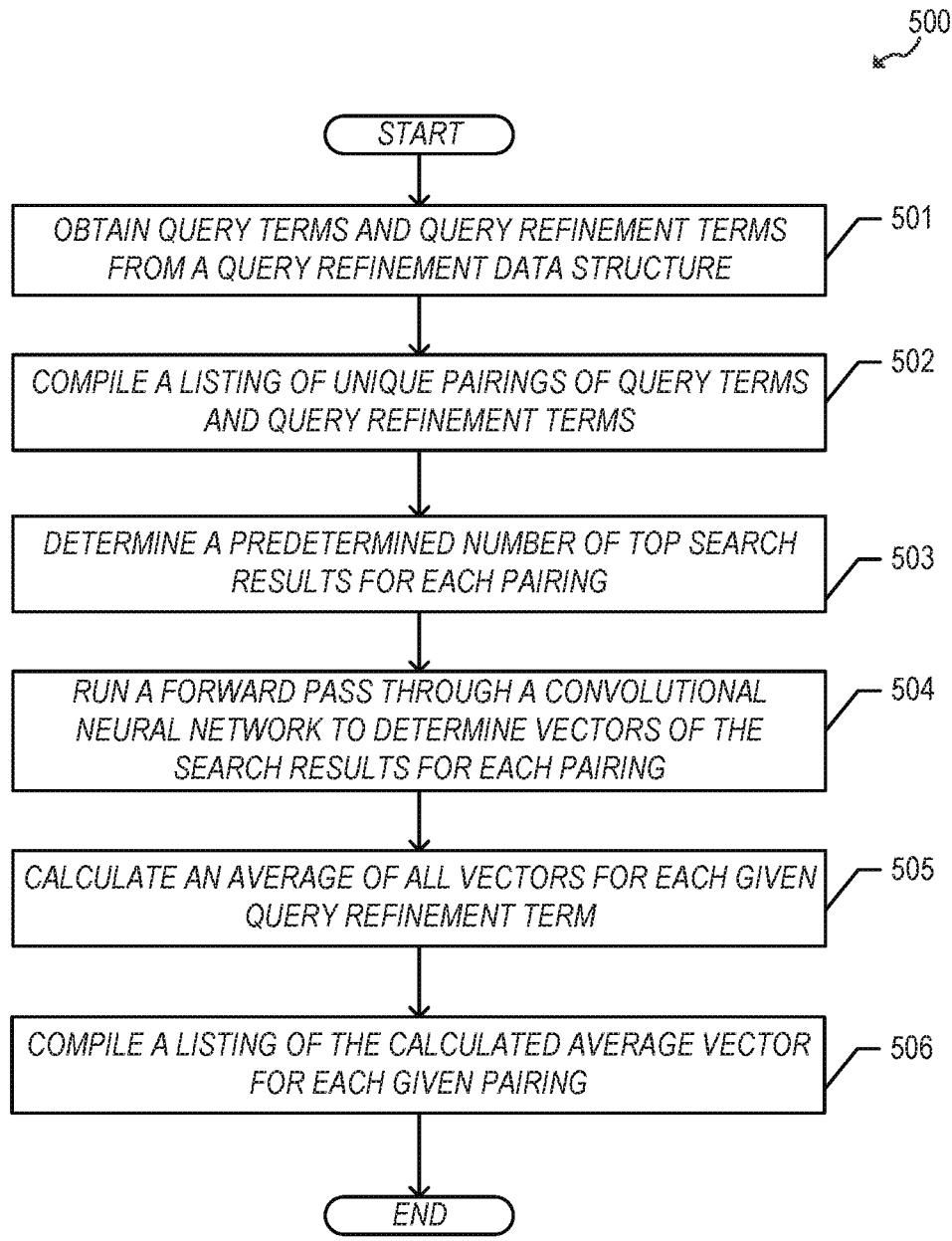
FIG. 5A illustrates an example offline process of averaging convolution-based image vectors for identifying salient objects in images using the example server of FIG. 2.

FIG. 5A illustrates an example offline process 500 of averaging convolution-based image vectors for identifying salient objects in images using the example server of FIG. 2. While FIG. 5A is described with reference to FIG. 2, it should be noted that the process steps of FIG. 5A may be performed by other systems. In one or more implementations, the process 500 leverages the convolutional neural network image vectors as a form of relevance feedback. In this respect, if the original query is "beach" and the user-supplied facets are "towel" and "sand", then the subject system takes the positive set of results indicated by the user, finds their respective image vectors by taking a forward pass, averages them together and treats this as the starting point.

The process 500 begins by proceeding from start step to step 501 when query terms and query refinement terms are obtained from the query refinement data structure. Next, in step 502, the subject system compiles a listing of unique pairings of query terms and query refinement terms. For example, the query term "beach" and query refinement terms "sand" and "waves" can be paired together to form unique pairings (e.g., (beach, sand), (beach, waves)).

Subsequently, in step 503, the subject system determines a predetermined number of top search results for each pairing. For example, the subject system, using the session logs, identifies the top N search results under the search pairing (beach, sand), where N is a positive integer. Next, in step 504, the subject system runs a forward pass through a trained convolutional neural network to determine vectors of the search results for each pairing. For example, the convolutional neural network receives each image that relates to the search pairing (e.g., (beach, sand)) using the image identifier of the image.

Subsequently, in step 505, the subject system calculates an average of all vectors for each given query refinement term. In step 506, the subject system compiles a listing of the calculated average vector for each given pairing. For example, the subject system may compile a table listing that is indexed by the unique pairings. In a first entry, the table listing may indicate the query "beach", the facet "sand" and an average vector for that facet (e.g., [0.3, 0.2, 0.4]). In a second entry, the table listing may indicate the query "beach", the facet "wave" and the average vector for that facet (e.g., [0.8, 0.2, 0.3]).

Figure 5B:
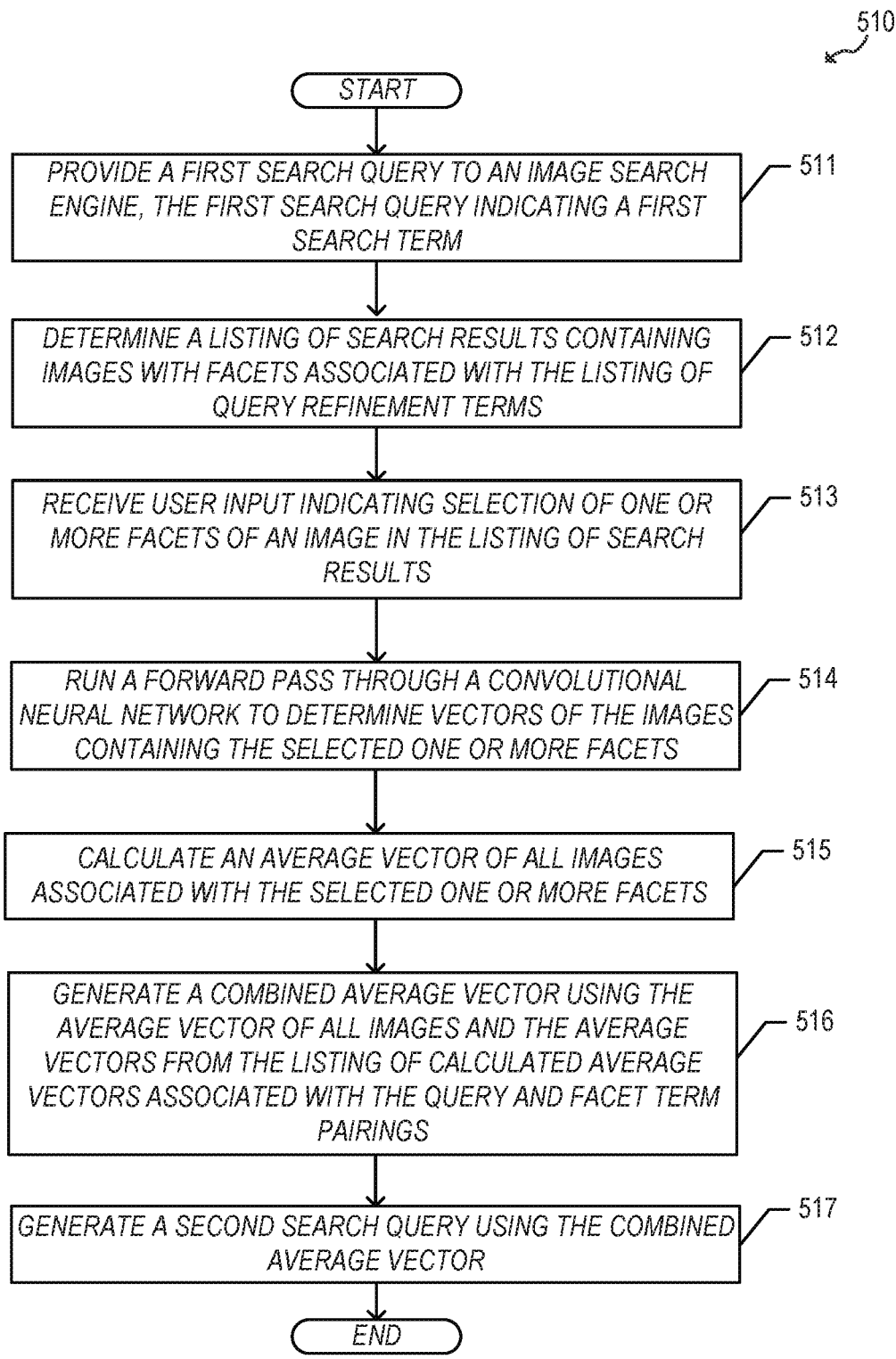
FIG. 5B illustrates an example runtime process of generating search results based on a combination of real-time average convolution-based image vectors and predetermined average convolution-based image vectors using the example server of FIG. 2.

FIG. 5B illustrates an example runtime process 510 of generating search results based on a combination of real-time average convolution-based image vectors and predetermined average convolution-based image vectors using the example server of FIG. 2. While FIG. 5B is described with reference to FIG. 2, it should be noted that the process steps of FIG. 5B may be performed by other systems.

The process 510 begins by proceeding from start step to step 511 when a first search query is provided to an image search engine to initiate an image search and retrieval. In one or more implementations, the first search query indicates a first search term. Next, in step 512, the subject system determines a listing of search results containing images with facets associated with the listing of query refinement terms. Subsequently, in step 513, the image search engine receives user input indicating selection of one or more facets for an image in the listing of search results. Next, in step 514, the subject system runs a forward pass through a convolutional neural network to determine vectors of the images associated with the selected one or more facets.

Subsequently, in step 515, the subject system calculates an average vector of all images associated with the selected one or more facets. In this step, each image is represented as a vector, where the vectors of all images that are selected (or indicated as positive results) are averaged together. The features that are most common among the images carry the highest weight. There is no starting point for the initial vector of the averaging; however, the previous vector becomes the starting point for each iteration thereafter.

Next, in step 516, the subject system generates a combined average vector using the average vector of all images and the average vectors from the listing of calculated average vectors associated with the query and facet term pairings. In one or more implementations, the average vector calculated in FIG. 5A is combined with the average vector calculated in FIG. 5B by taking a step in the direction of the facets identified in FIG. 5B starting with the average vector from FIG. 5A. In one or more implementations, negative facet information is incorporated into the recall phase, thus removing (or filtering out) images matching the negative dynamic facets (e.g., images marked for deselection). In step 517, the subject system generates a second search query using the combined average vector.

Figure 6:
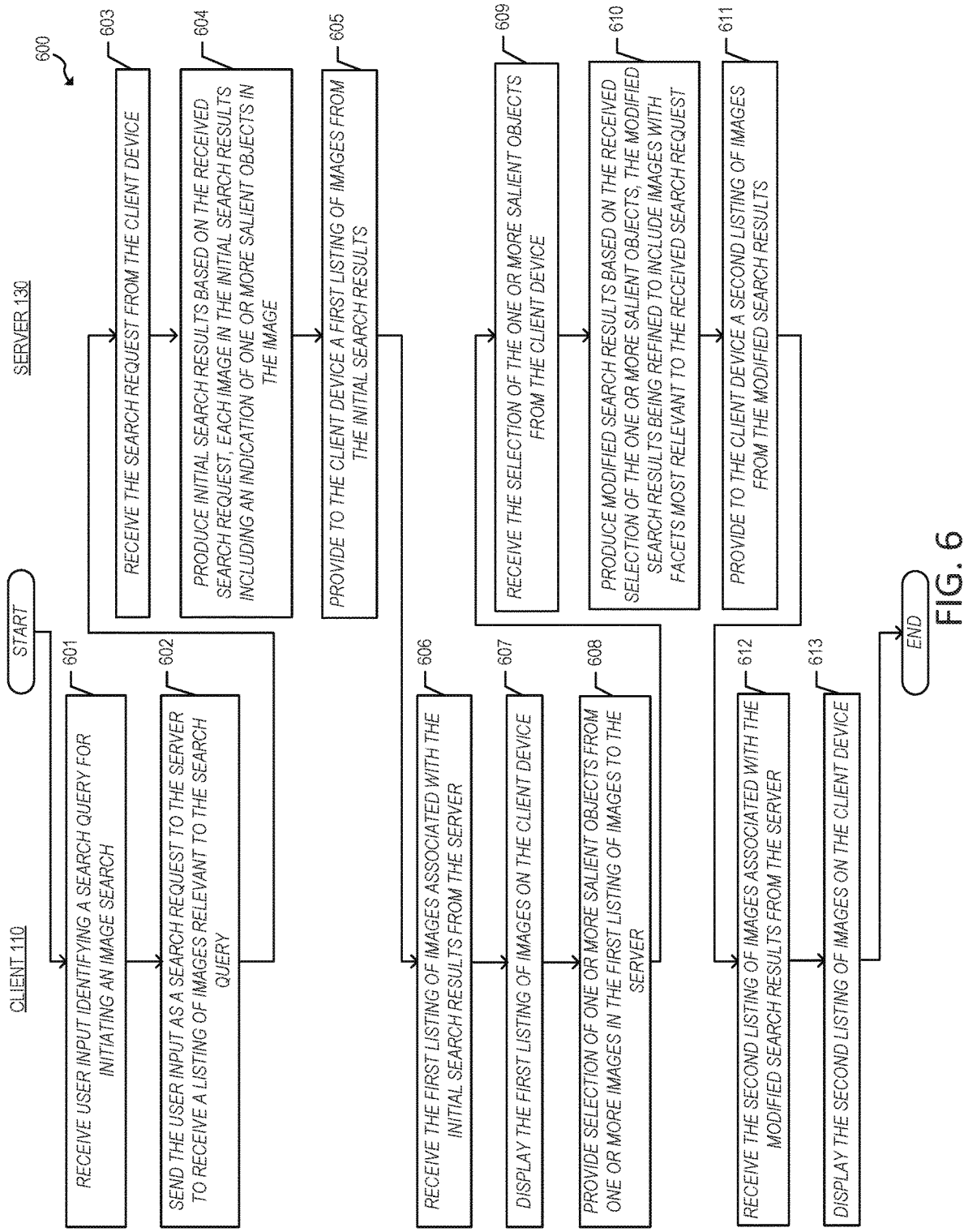
FIG. 6 illustrates an example process for content search by relevance feedback using the example client and server of FIG. 2.

FIG. 6 illustrates an example process 600 for content search by relevance feedback using the example client and server of FIG. 2. The process 600 begins in step 601 when a user, for example, loads an application 222 on a client 110 and the client 110 receives an input from the user using the input device 216 for a search query to initiate an image search through a collection of images 252. The input identifies one or more search terms in a given natural language for initiating the image search. The user input may include one or more search terms, phrases, sentences and/or suitable characters that trigger the image search engine 242 to search through the collection of images 252. In this respect, a search engine may identify images that are responsive to a search query by identifying images based on one or more object classes to which the identified image may be a member. The user can utilize the input device 216 to submit one or more search terms as part of a text-based search query via a user interface of the application 222.

Next, in step 602, the application 222 on the client 110 sends the user input as a search request to the server 130 in order to receive a listing of images responsive to the text-based search query. Turning to the server 130, in step 603, the server 130 receives the search request for a listing of images from the client 110.

Subsequently, in step 604, the server 130 can determine one or more image identifiers corresponding to the search query to produce initial search results based on the received search request. For example, the search query (or request) may indicate a search term "beach", and hence, the server 130 may determine an image identifier associated with the search term "beach". In one or more implementations, the server 130 determines a collection of images associated with the one or more image identifiers. For example, the image identifier may be associated with a cluster of images that contain content relevant to the search term "beach".

Next, in step 605, the server 130 provides to the client 110 a first listing of images from the initial search results. Turning back to the client 110, in step 606, the client 110 receives the first listing of images associated with the initial search results from the server 130. Subsequently, in step 607, the client 110 displays the first listing of images on a display device of the client 110.

Next, in step 608, the client 110 provides selection of one or more salient objects from one or more images in the first listing of images to the server 130. Turning back to the server 130, in step 609, the server 130 receives the selection of the one or more salient objects from the client 110.

Subsequently, in step 610, the server 130 produces modified search results based on the received selection of the one or more salient objects. In one or more implementations, the modified search results are refined to include images with facets most relevant to the received search request from the client 110.

Next, in step 611, the server 130 provides to the client 110 a second listing of images from the modified search results. Turning back to the client 110, in step 612, the client 110 receives the second listing of images associated with the modified search results from the server 130. Next, in step 613, the second listing of images is provided for display via the application 222 of the client 110.

Figure 7:
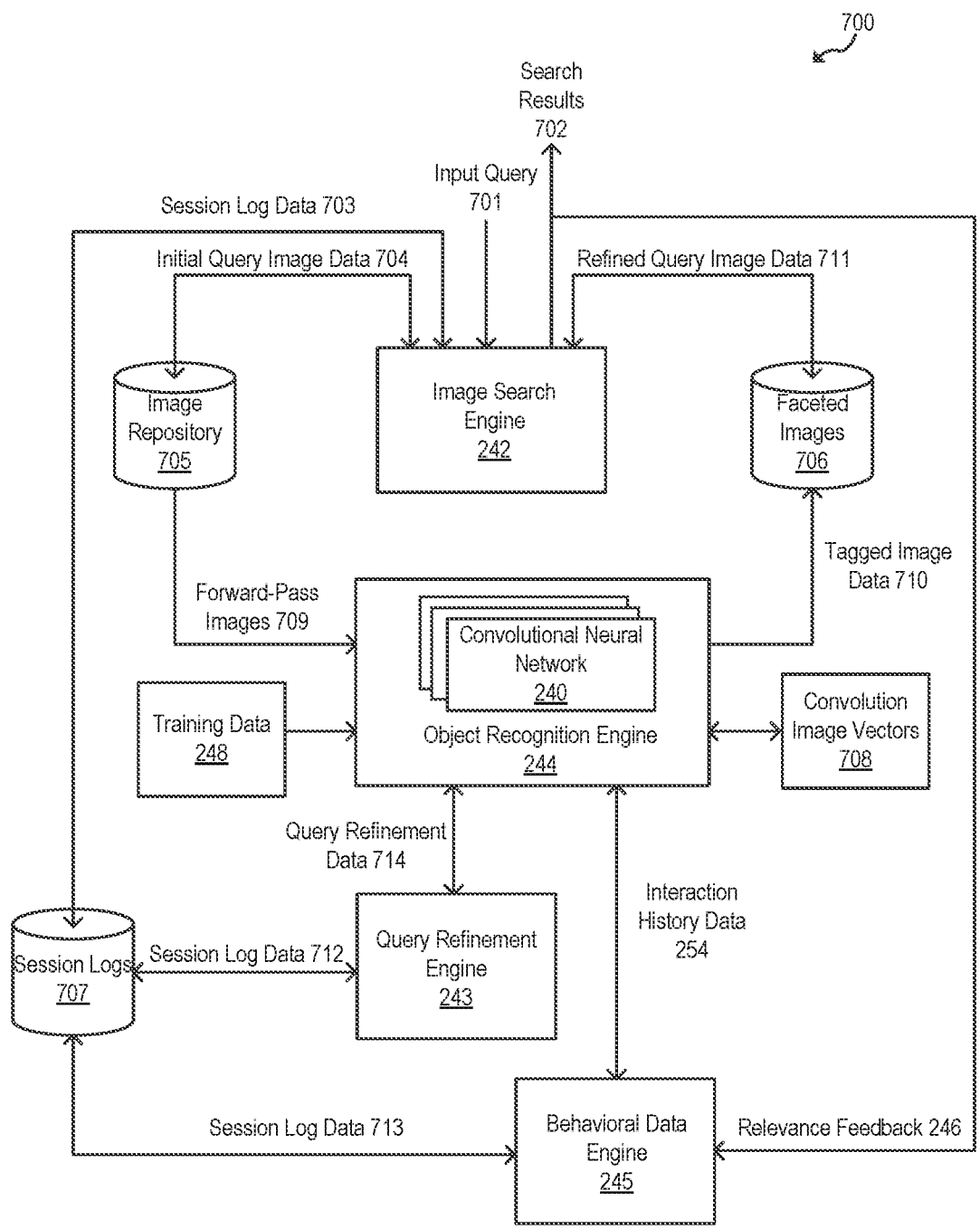
FIG. 7 illustrates a schematic diagram of an example architecture suitable for practicing the example process of FIG. 4.

FIG. 7 illustrates a schematic diagram of an example architecture 700 suitable for practicing the example processes of FIGS. 3A, 3B, 4A through 4C, 5A, 5B and 6. In FIG. 7, the architecture 700 provides for an input search query to search for images corresponding to one or more image identifiers that map, or at least in part, to a term or phrase in the input search query for retrieving a set of images relevant to the input search query.

In an offline session, the processor 236 of the server 130, using the query refinement engine 243, obtains the session log data 712 associated with one or more users from the session logs 707. The processor 236, using the query refinement engine 243, determines one or more search queries from the session log data 712. For each of the one or more search queries, the processor 236, using the query refinement engine 243, determines one or more refinement queries. The processor 236, using the query refinement engine 243, provides the determined one or more refinement queries to a query refinement data structure. In one or more implementations, the query refinement engine 243 stores the refinement queries as part of the session logs 707, where the query refinement data structure is included in the session logs 707.

In an offline session, the processor 236, using the query refinement engine 243, obtains the session log data 712 associated with one or more users from the session logs 707. The processor 236, using the query refinement engine 243, extracts the most popular search queries from the obtained session log data 712. For each search query, the processor 236, using the image search engine 243 and the query refinement engine 243, determines the most popular images from an image collection in the image repository 705. The processor 236, using the object recognition engine 244, determines salient objects in each image using the forward-pass images 709 from the image repository 705. The images processed through the object recognition engine 244 are then provided as tagged image data 710 to a faceted images repository 706.

The tagged image data 710 may indicate an object probability for each example image. The tagged image data 710 from the objection recognition engine 244 may include metadata for association with the example image in the image repository 705. The metadata may include an image identifier and/or the object probability for a corresponding salient object. The tagged image data 710 from the trained object recognition engine 244 may be stored in an image repository where segmented images are stored separately from the image repository 705 (e.g., 706) or stored as part of the image repository 705. The operation of building an image search space (e.g., the collection of images 252) may be performed recursively in a closed loop until a set of example images, for a given object class and/or a set of object classes, includes a range of images with varying degrees of salient objects.

In training the convolutional neural network 240 to recognize objects in an image, the processor 236 submits a plurality of training images (e.g., set of training data 248) to the convolutional neural network 240 that is configured to analyze pixel data for each of the plurality of training images to identify features in each of the plurality of training images. The convolutional neural network 240, running an object class training algorithm, processes the different images in the set of training data 248 to learn to identify features in the images that correspond to an object class. In one or more implementations, the set of training data 248 includes multiple sets of training images, where each set of training images corresponds to one particular object class. In this respect, the convolutional neural network 240 extracts features and transforms these features into a feature descriptor vector for mapping to an object class that corresponds to the particular set of training images. In this example, each object class has its own convolutional neural network. In this respect, weights in a respective convolutional neural network 240 are trained during the training phase, and each of the convolutional neural networks 240 provides processed pixel data as convolution image vectors 708.

The processor 236, using the object recognition engine 244, composed of multiple object classifiers (e.g., a series of convolutional neural networks), feeds image pixel data for forward-pass images 709, from the collection of images 252, through a number of object classifiers. For each image, the object recognition engine 244 produces multiple object class probabilities using a number of object classifiers. In some embodiments, the process of generating an object class probability from each of the object classifiers may be performed in parallel of one another. Each of the object class probability values may indicate the likelihood that an image is a member of a subject object class based on pixel data of the image. In one or more implementations, the probability distribution array represents a two-dimensional probability waveform, where the x-dimension refers to the compiled object classes (e.g., beach, apple, etc.) and the y-dimension refers to probability values (e.g., 0.0 to 1.0) corresponding to the respective object classes.

In a runtime session, the processor 236 of the server 130 is configured to receive an input query 701 from a user. The input query 701 identifies one or more search terms for initiating an image search. Upon receiving the input query 701, the processor 236, using the image search engine 242, submits the input query 701 to index the image repository 705 using initial query image data 704.

In turn, the processor 236 then receives an identification of a plurality of images from the collection of images 252 that are responsive to the input query 701. The collection of images 252 may be stored in the image repository 705 accessible to the server 130. In one aspect, the plurality of images is tagged with an image identifier along with the pixel data of the image. In one or more implementations, the processor 236, using the image search engine 243, obtains image metadata through the initial query image data 704 from the image repository 705.

The processor 236, using the query refinement engine 243, obtains a listing of query refinement terms associated with the first search query from the query refinement data structure in the session logs 707. The processor 236, using the image search engine 243 and the query refinement engine 243, determines a listing of search results 702 containing images with facets associated with the listing of query refinement terms. This listing may be stored back in the session logs 707, and subsequently retrieved by the image search engine 242 via the session log data 703 for returning the listing of search results 702.

In one or more implementations, the image search engine 242 returns images (e.g., 702) obtained through the refined query image data 711 from the faceted images repository 706. In one or more implementations, the processor 236 provides the search results 702 with a ranking according to a proportion that the user desires to retrieve more or less relevant content. The processor 236 may provide the ranked search results 702 to the application 222 on the client 110 over the network 150 for display by an output device 214 of the client 110.

In one or more implementations, the processor 236, using the image search engine 242, may obtain an image identifier that corresponds to the input query 701. For example, the input query 701 may include a search term "beach" such that the image identifier associated with the search term "beach" is used to index the image repository 705. In this respect, a cluster of images that is relevant to the search term "beach" are indexed. Among the cluster of images, a subset of object classes corresponding to the query search term may be identified. The processor 236, using the image search engine 242, may filter images corresponding to the identified object classes. In turn, the filtered images are then provided as part of the search results 702.

The processor 236, using the image search engine 243 and the behavioral data engine 245, receives relevance feedback data 246 indicating selection of one or more facets of an image in the listing of search results. In one or more implementations, the relevance feedback data 246 may be stored in the session logs 707 as the session log data 713.

In one or more implementations, weights may be applied to the relevance feedback data 246. A weight value may be applied to one query refinement term. For example, a certain weight may represent that a certain salient object in the image is highly likely more consistent to what the user intended in the search query. In some aspects, the weights assigned to each of the query refinement terms may be adjustable by a user preference setting. In one or more implementations, the weight values may be applied to search queries generated by the image search engine 242 to influence an image search session toward the original search query or toward the query refinement term added to the search query.

In one or more implementations, the behavioral data engine 245 provides interaction history data 254 to the object recognition engine 244 to facilitate any further training of the convolutional neural network 240 by supplying user information that indicates which images with certain features are more likely to be selected or interacted with for a given search query during a runtime operation. In turn, the convolution neural network 240 may have its weights adjusted to increase the amount of accuracy in recognizing objects within images. In one or more implementations, the relevance feedback data 246 can be used to find the most relevant search results from the image search engine 242. For example, output from the behavioral data engine 245 based on the relevance feedback data 246 may be input back into the image search engine 242 via the session logs 707 to produce a more precise listing of search results.

The processor 236, using the image search engine 243 and the query refinement engine 243, generates a second search query using the first search query and a second search query indicating the selected one or more facets. In one or more implementations, the image search engine 242 combines the two queries together to form one new search query.

In one or more implementations, the convolutional neural network image vectors are used to incorporate the feedback to generate new results. In an offline session, the processor 236, using the query refinement engine 243, obtains query terms and query refinement terms from the query refinement data structure stored in the session logs 707 through the session log data 712. The processor 236, using the query refinement engine 243, compiles a listing of unique pairings of query terms and query refinement terms. The processor 236, using the image search engine 243 and the query refinement engine 243, determines a predetermined number of top search results for each pairing using the session log data 703. The processor 236, using the object recognition engine 244, runs a forward pass through the trained convolutional neural network 240 to determine vectors of the search results for each pairing. In one or more implementations, the object recognition engine 244 provides these vectors as the convolution image vectors 708. The processor 236, using the object recognition engine 244, calculates an average of all vectors for each given query refinement term using the convolution image vectors 708 and the query refinement data 714. The processor 236, using the object recognition engine 244, compiles a listing of the calculated average vector for each given pairing.

In a runtime session, the processor 236, using the image search engine 243, receives a first search query (e.g., 701) to initiate an image search and retrieval. The processor 236, using the image search engine 243 and the query refinement engine 243, determines a listing of search results containing images with facets associated with the listing of query refinement terms using the session log data 703 from the session logs 707. The processor 236, using the image search engine 243 and the behavioral data engine 245, receives the relevance feedback data 246 indicating selection of one or more facets for an image in the listing of search results. The processor 236, using the object recognition engine 244, runs a forward pass through the convolutional neural network 240 to determine the convolution image vectors 708 associated with the selected one or more facets. The processor 236, using the object recognition engine 244, calculates an average vector of all images associated with the selected one or more facets using the corresponding vector information from the convolution image vectors 708. The processor 236, using the object recognition engine 244, generates a combined average vector using the average vector of all images and the average vectors from the listing of calculated average vectors associated with the query and facet term pairings using the query refinement data 714 and respective vector information from the convolution image vectors 708.

The processor 236, using the image search engine 243 and the object recognition engine 244, generates a second search query using the combined average vector.

Figure 8:
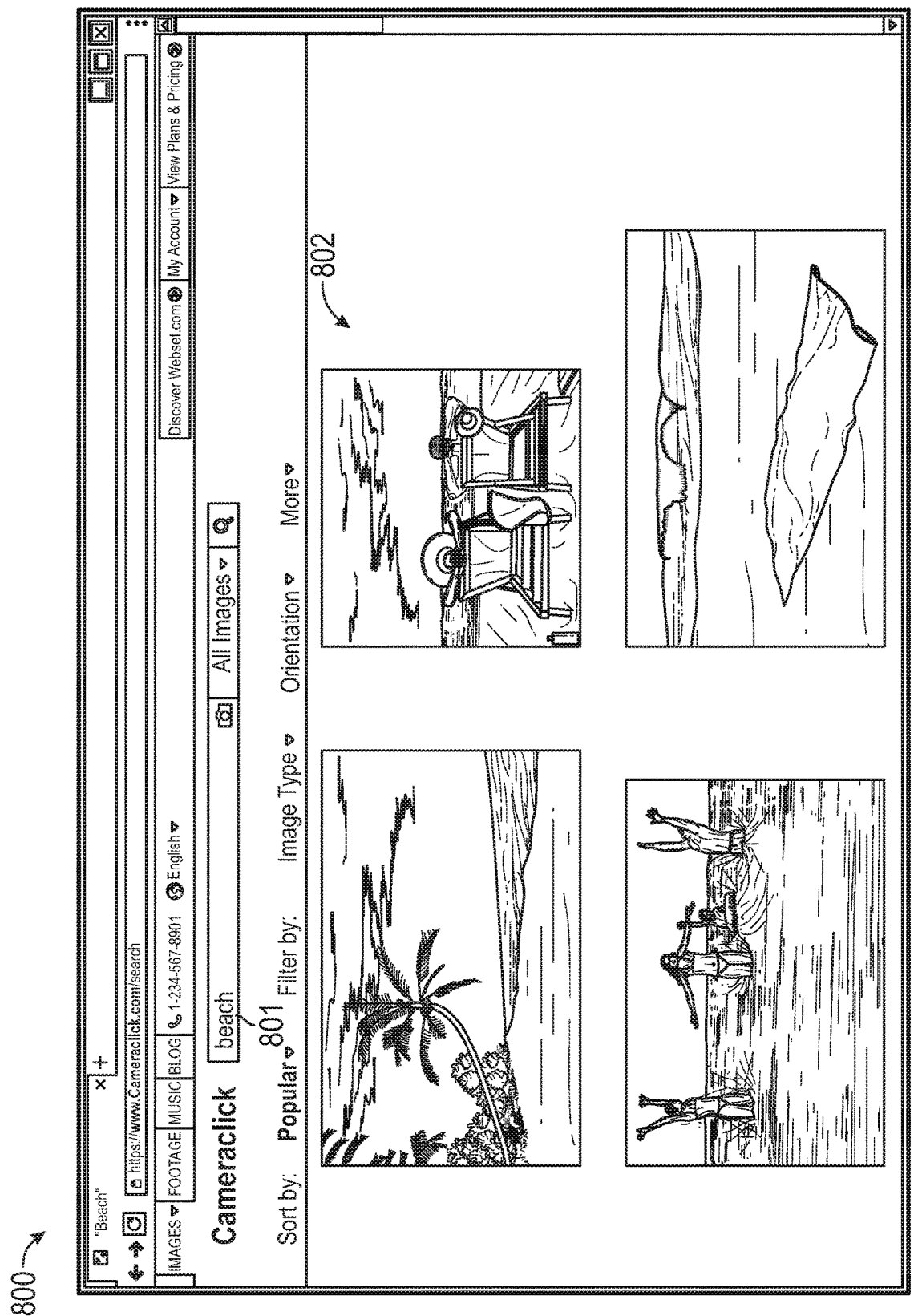
FIG. 8 illustrates an example of a user interface for content search.

FIG. 8 provides an example of a user interface 800 for initiating an image search via an application 222 and presenting image search results responsive to a text-based image search query in a given natural language (e.g., English). In some aspects, the image search may be initiated using different natural languages (e.g., Spanish, French, German, etc.) depending on implementation. The user interface 800 includes search controls such as sorting and filtering. In one or more implementations, the user interface 800 includes a control to sort by a ranking such as popularity. In one or more implementations, the user interface 800 includes a control to filter by the image orientation and/or image type. The user interface 800 may include other search controls to refine the listing of images within the scope of the given search query. In this respect, the images may be tagged with metadata that includes a keyword that corresponds to one of the search control features, and thereby facilitate the sorting and filtering of the search results.

In FIG. 8, the listing of images (e.g., 802) is displayed in a mosaic-based layout but the listing of images may be in a different layout depending on implementation. The listing of images may include a predetermined layout set by the image search service or by user preferences depending on implementation. In one or more implementations, the layout may be adjusted in real-time based on user interaction with the layout.

The user interface 800 includes an input section 801 and an output section 802. The input section 801 may include an input search field that is configured to receive one or more search terms and/or phrases associated with the text-based image search query. The output section 802 includes search results composed of a listing of images. The listing of images includes images corresponding to the search term and/or phrase of the given search query. In this example, the given search query includes the term "beach", and therefore, the image search service returned the listing of images that includes images of a beach captured in multiple variations.

Figure 9:
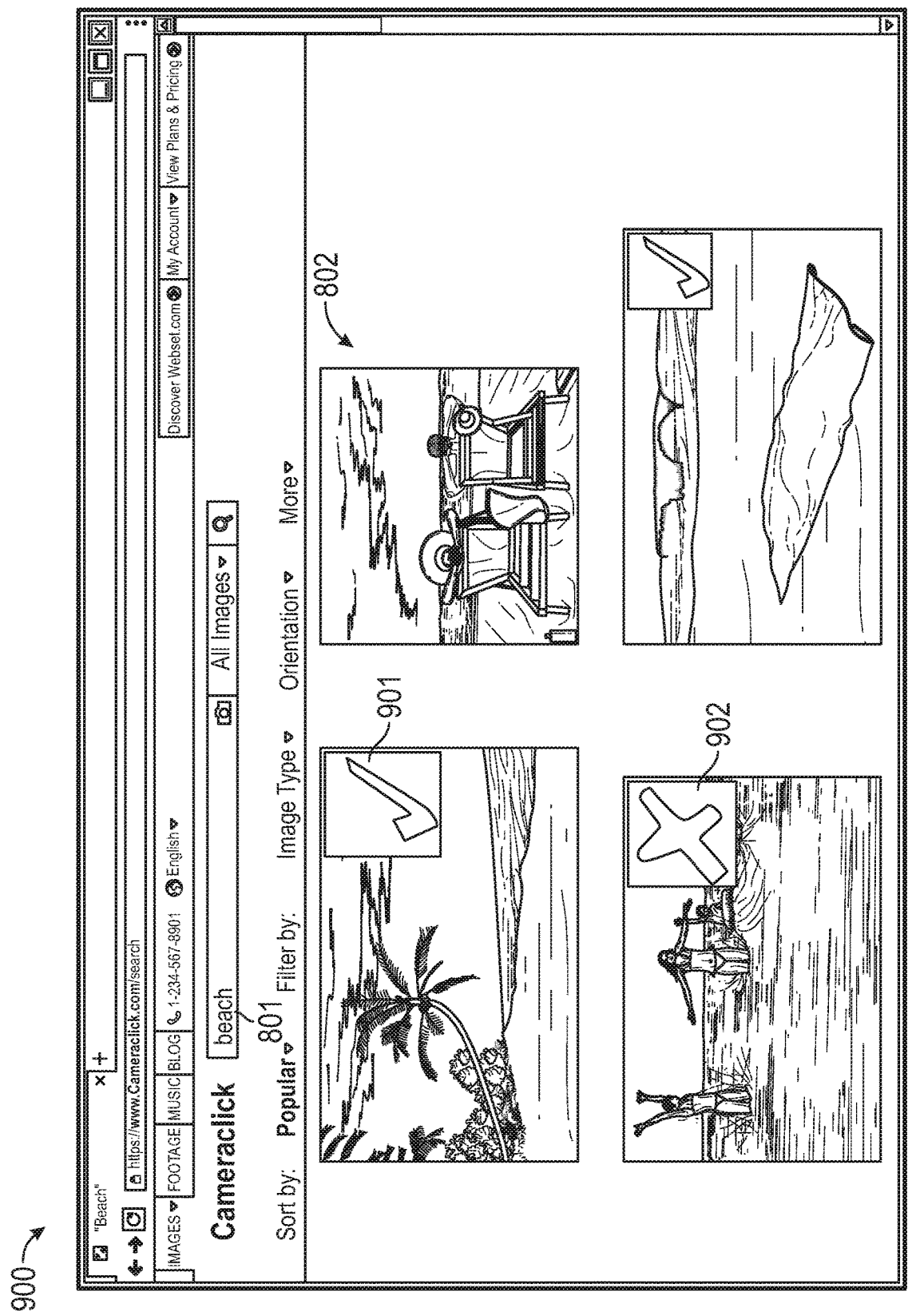
FIGS. 9 through 11 illustrate examples of a user interface for faceted content search by relevance feedback.
Figure 10:
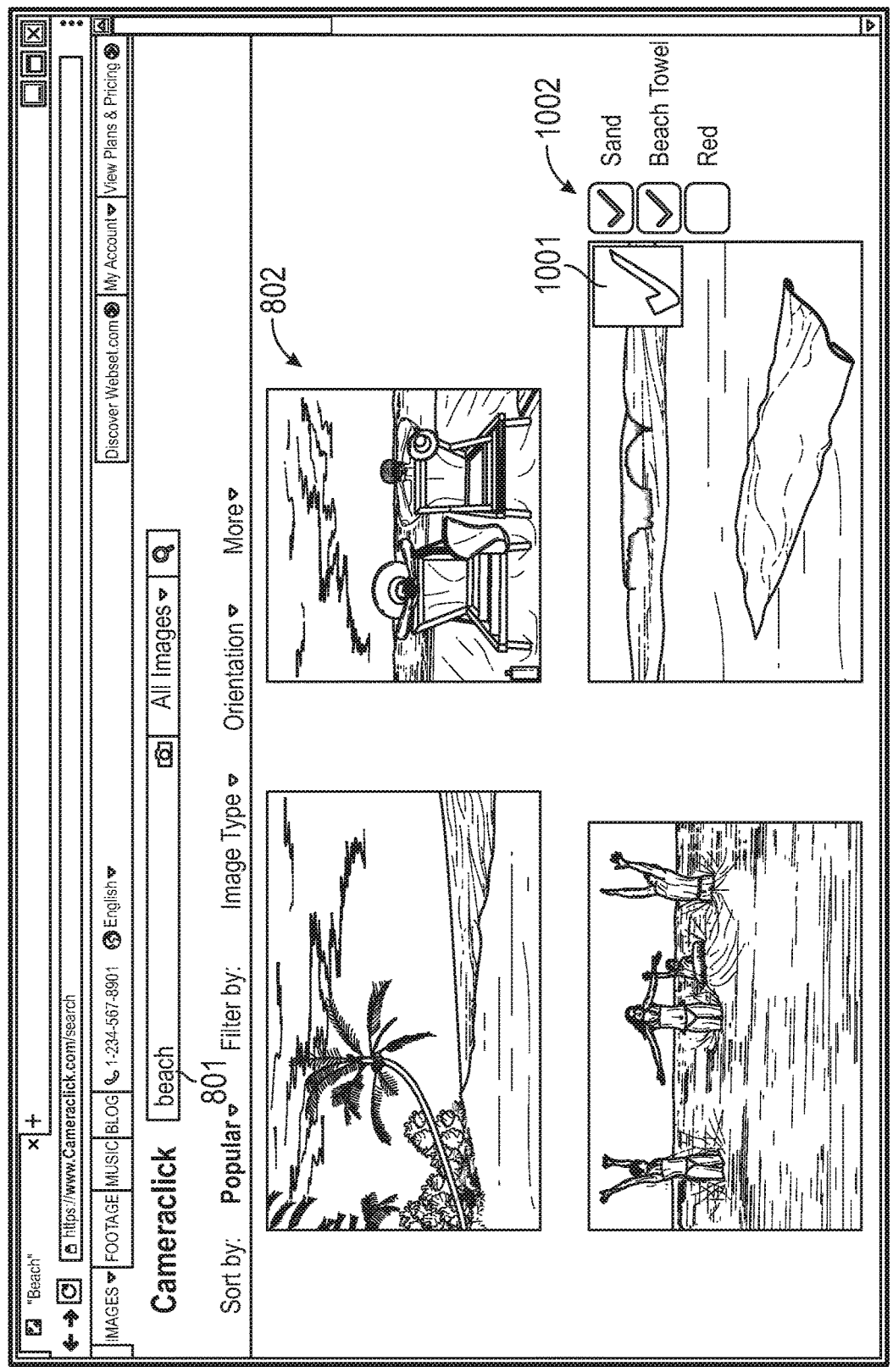
Figure 11:
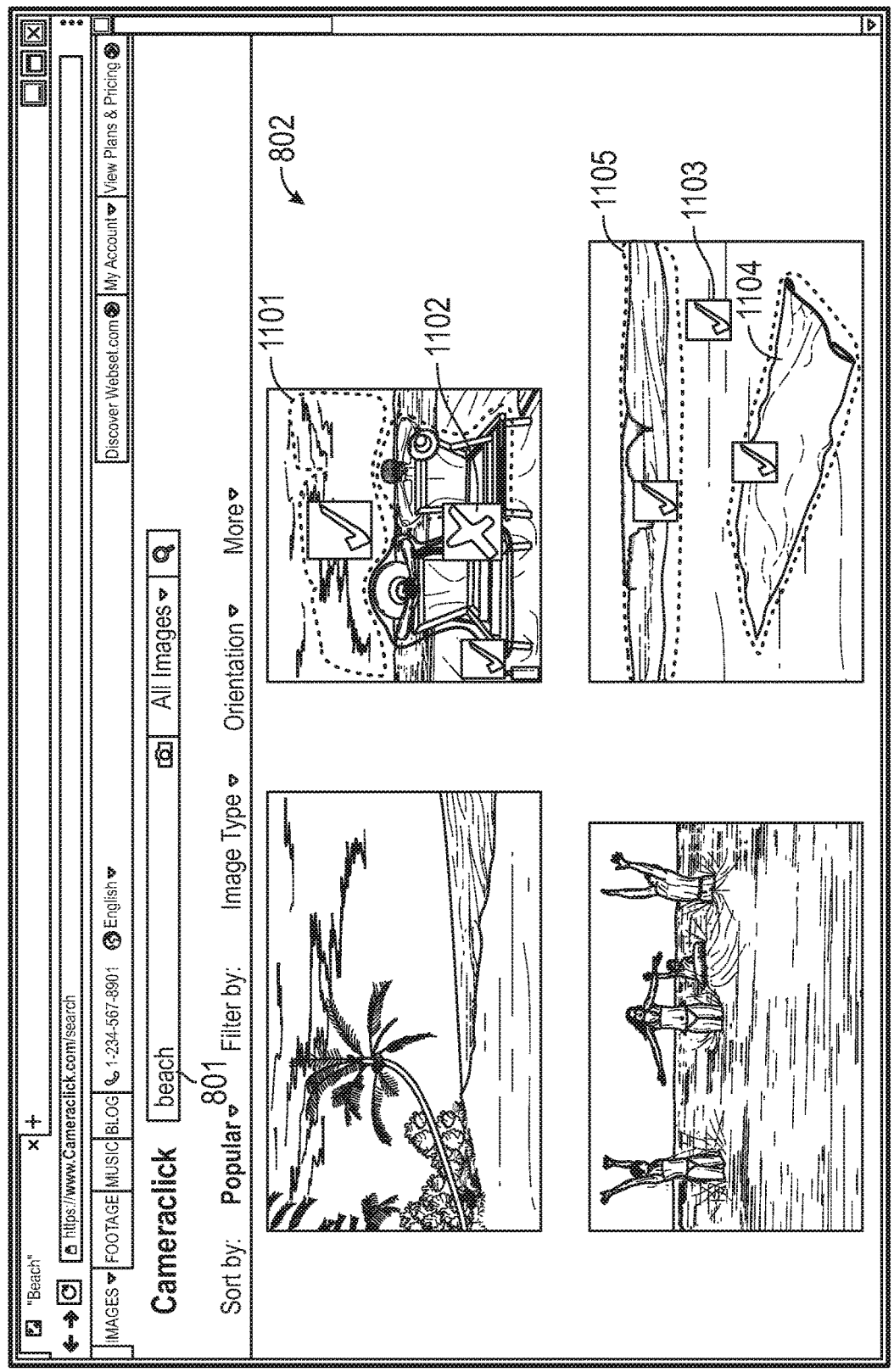

FIGS. 9 through 11 illustrate examples of a user interface for faceted content search by relevance feedback. Specifically, FIG. 9 provides an example of a user interface 900 for initiating an image search via an application 222 using basic relevance feedback. Instead of having a user enter a text query and then presenting them with a static set of results, the present disclosure provides for the user to indicate through the user interface 900 what results are desirable and what are not. An arbitrary number of the initial search results can be tagged as being "good" or "bad" results for the image. In FIG. 9, image 901 is marked with an indication that the image is a desirable or good result, whereas image 902 is marked with an indication that the image is not a desirable or bad result. Once a set of initial results are tagged, the processor 236, using the image search engine 242, then incorporates that feedback to present a new, improved set of results, potentially iterating in successive manner, and each time presenting a set of search results that is more relevant with what the user was searching for.

FIG. 10 provides an example of a user interface 1000 for initiating an image search via an application 222 using relevance feedback with textual dynamic facets. In FIG. 10, the listing of images (e.g., 802) includes one or more images with a feedback interface 1002 that queries a user to input a selection of one or more image options from the feedback interface 1002. For example, image 1001 includes a first indication that the image is a good result (e.g., a checkmark)

including selection of the facet terms "sand" and "beach towel" (and not the term "red") as features indicating why the image 1001 is a good search result. The processor 236, using the image search engine 242, then incorporates the selected facet terms (e.g., sand, beach towel) to present a new set of results that includes images with objects representing a beach with sand and beach towels as features that are more consistent with the user's intentions with the image search query. In one or more implementations, the images with features representing the user-selected facet terms are presented in greater proportion than other images that may be part of the modified set of search results.

FIG. 11 provides an example of a user interface 1100 for initiating an image search via an application 222 using relevance feedback with regions of images enabled for user interaction. In FIG. 11, the listing of images (e.g., 802) includes one or more images with at least one region of the image segmented for user interaction. For example, the image 1101 includes multiple regions segmented as features available for user selection to serve as feedback. In FIG. 11, the image 1101 includes a first region representing "sand", a second region representing "clouds", and a third region representing "chairs with people", where the sand and clouds are selected as indicative of good results and the chairs with people is deselected as indicative of a bad result. The listing of images includes a second image with a first region 1103 representing sand being selected, a second region 1104 representing a towel being selected, and a third region representing waves being selected, as all features that make the second image a good search result. The processor 236, using the image search engine 242, then incorporates the selected facet terms (e.g., sand, beach towel, waves and clouds) to present a new set of results that includes images with objects representing a beach with sand, beach towels, waves and a cloudy sky as features that are more consistent with the user's intentions with the image search query.

Hardware Overview

FIG. 12 is a block diagram illustrating an exemplary computer system 1200 with which the client 110 and server 130 of FIG. 1 can be implemented. In certain aspects, the computer system 1200 may be implemented using hardware or a combination of software and hardware, either in a dedicated server, or integrated into another entity, or distributed across multiple entities.

Computer system 1200 (e.g., client 110 and server 130) includes a bus 1208 or other communication mechanism for communicating information, and a processor 1202 (e.g., processor 212 and 236) coupled with bus 1208 for processing information. By way of example, the computer system 1200 may be implemented with one or more processors 1202. Processor 1202 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1200 can include, in addition to hardware, code that creates an execution environment for the computer program in question, e.g., code that constitutes processor firmware, a protocol stack, a database management system, an operating system, or a combination of one or more of them stored in an included memory 1204 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1208 for storing information and instructions to be executed by processor 1202. The processor 1202 and the memory 1204 can be supplemented by, or incorporated in, special purpose logic circuitry.

The instructions may be stored in the memory 1204 and implemented in one or more computer program products, i.e., one or more modules of computer program instructions encoded on a computer readable medium for execution by, or to control the operation of, the computer system 1200, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1204 may also be used for storing temporary variable or other intermediate information during execution of instructions to be executed by processor 1202.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1200 further includes a data storage device 1206 such as a magnetic disk or optical disk, coupled to bus 1208 for storing information and instructions. Computer system 1200 may be coupled via input/output module 1210 to various devices. The input/output module 1210 can be any input/output module. Exemplary input/output modules 1210 include data ports such as USB ports. The input/output module 1210 is configured to connect to a communications module 1212. Exemplary communications modules 1212 (e.g., communications modules 218 and 238) include networking interface cards, such as Ethernet cards and modems. In certain aspects, the input/output module 1210 is configured to connect to a plurality of devices, such as an input device 1214 (e.g., input device 216) and/or an output device 1216 (e.g., output device 214). Exemplary input devices 1214 include a keyboard and a pointing device, e.g., a mouse or a trackball, by which a user can provide input to the computer system 1200. Other kinds of input devices 1214 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 1216 include display devices, such as a LCD (liquid crystal display) monitor, for displaying information to the user.

According to one aspect of the present disclosure, the client 110 and server 130 can be implemented using a computer system 1200 in response to processor 1202 executing one or more sequences of one or more instructions contained in memory 1204. Such instructions may be read into memory 1204 from another machine-readable medium, such as data storage device 1206. Execution of the sequences of instructions contained in main memory 1204 causes processor 1202 to perform the process steps described herein. One or more processors in a multi-processing arrangement may also be employed to execute the sequences of instructions contained in memory 1204. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1200 can include clients and servers. A client and server are generally remote from each other and typically interact through a communication network. The relationship of client and server arises by virtue of computer programs running on the respective computers and having a client-server relationship to each other. Computer system 1200 can be, for example, and without limitation, a desktop computer, laptop computer, or tablet computer. Computer system 1200 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1202 for execution. Such a medium may take many forms, including, but not limited to, non-volatile media, volatile media, and transmission media. Non-volatile media include, for example, optical or magnetic disks, such as data storage device 1206. Volatile media include dynamic memory, such as memory 1204. Transmission media include coaxial cables, copper wire, and fiber optics, including the wires that comprise bus 1208. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
receiving a user input identifying a search query for content from a collection of images from a client device, the search query indicating a first search term;
providing a first set of search results to the client device based on the search query, the first set of search results including first images associated with the first search term from the collection of images;
providing a user interface control with each of the first images, the user interface control providing, for display, multiple facets, identified using object recognition, for an image that is selected based on data from past user session logs, the facets prompting a user to provide a feedback with respect to the image;
compiling a listing of unique pairings of one or more query terms from a prior search query and the facets;
selecting a predetermined number of top search results for each unique pairing;
receiving an indication of the feedback via the user interface control; and
providing a second set of search results to the client device based on the indication of the feedback and one of the predetermined number of top search results for each unique pairing, the second set of search results including second images associated with a second textual search term based on the facets, the second textual search term being a refinement to the first search term and having a different weighted value than the first search term.

2. The computer-implemented method of claim 1, wherein the indication of the feedback comprises selection of at least one of the facets, the selection indicating that the image is a positive result based on the facets.

3. The computer-implemented method of claim 2, wherein the indication of the feedback comprises a deselection of at least one of the facets, the deselection of at least one of the facets indicating that the image is a negative result based on the at least one of the facets.

4. The computer-implemented method of claim 1, wherein the user interface control indicates one or more segmented regions for each of the first images, and
wherein the feedback includes selection of at least one of the one or more segmented regions based on a user interaction with the one or more segmented regions, the selection of the one or more segmented regions indicating that an object represented by a segmented region is a positive result.

5. The computer-implemented method of claim 4, wherein the feedback includes a deselection of at least one of the one or more segmented regions based on the user interaction with the one or more segmented regions, the deselection of at least one of the one or more segmented regions indicating that the object represented by the segmented region is a negative result.

6. The computer-implemented method of claim 1, further comprising:
receiving a user selection of at least one of the facets as part of the feedback via the user interface control;
modifying the first set of search results into the second set of search results based on the user selection of at least one of the facets; and
providing a prioritized listing of images from the second set of search results for display on the client device, the prioritized listing of images including images that contain image features that correspond to the facets.

7. The computer-implemented method of claim 1, further comprising:
receiving a user command to exclude one or more image features from the search query via the user interface control;
modifying the first set of search results into the second set of search results based on the user command; and
providing a prioritized listing of images from the second set of search results for display on the client device, the prioritized listing of images excluding images that contain the one or more image features excluded by the user command.

8. The computer-implemented method of claim 1, further comprising:
providing a plurality of sets of training images to a computer-operated convolutional neural network, wherein the computer-operated convolutional neural network processes the plurality of sets of training images to learn to identify features relating to at least one of a plurality of object classes, and wherein each of the plurality of sets of training images is associated with one object class of the plurality of object classes;
generating feature vectors for each training image in the plurality of sets of training images using the computer-operated convolutional neural network; and
clustering the feature vectors into a plurality of clusters, wherein at least one of the plurality of clusters is associated with one or more of the first search term or the second textual search term.

9. The computer-implemented method of claim 8, further comprising:
generating processed pixel data including the feature vectors from the plurality of sets of training images;
determining a probability using the computer-operated convolutional neural network for an object class, the probability indicating a likelihood that a subject image corresponds to the object class; and
providing an aggregate of probabilities that includes a probability for each object class in a set of object classes.

10. The computer-implemented method of claim 1, further comprising:
obtaining session log data associated with one or more users from a session log;
determining one or more search queries from the session log data;

determining one or more refinement queries for each of the one or more search queries; and providing the one or more refinement queries to a query refinement data structure.

11. The computer-implemented method of claim 10, further comprising:

extracting a predetermined number of search queries from the session log data, wherein each of the predetermined number of search queries includes a query interaction frequency that exceeds a query popularity threshold;

determining a predetermined number of images from an image collection for each of the predetermined number of search queries, wherein each image from the predetermined number of images includes an image interaction frequency that exceeds an image popularity threshold; and determining salient objects in each image of the predetermined number of images.

12. The computer-implemented method of claim 10, further comprising:

obtaining query terms and query refinement terms from a query refinement data structure;

running a forward pass through a trained convolutional neural network to determine convolution image vectors of the predetermined number of top search results for each unique pairing;

calculating an average of all vectors for each given query refinement term; and compiling a listing of the average of all vectors for each given pairing.

13. The computer-implemented method of claim 12, further comprising:

determining a listing of search results containing images with facets associated with a listing of query refinement terms;

receiving a user input indicating selection of one or more of the facets for an image in the listing of search results;

running a forward pass through the trained convolutional neural network to determine a convolution image vector of each image in the listing of search results associated with the facets;

calculating an average vector of all images associated with the facets;

generating a combined average vector using the average vector of all images and multiple average vectors from the listing of the average vectors associated with the one or more query terms and facet term pairings; and generating a second search query using the combined average vector.

14. A system comprising:

one or more processors;

a computer-readable storage medium coupled to the one or more processors, the computer-readable storage medium including instructions that, when executed by the one or more processors, cause the one or more processors to:

provide a first search query to an image search engine for initiating an image search, the first search query indicating a first search term;

obtain image metadata from an image collection via the image search engine;

obtain a listing of query refinement terms associated with the first search query from a query refinement data structure;

determine a listing of search results containing images with multiple facets that is identified using object recognition, and is associated with the listing of query refinement terms, the facets being selected for display based on data from past user session logs;

compile a listing of unique pairings of one or more query terms from a prior search query and the facets;

select a predetermined number of top search results for each unique pairing;

receive a user input indicating selection of at least one of the predetermined number of top search results for each unique pairing; and provide a second search query to the image search engine using the first search term and a second textual search term indicating the facets and having a different weighted value than the first search term.

15. The system of claim 14, wherein the user input comprises selection of at least one of the facets, the selection of at least one of the facets indicating that an image is a positive result based on the facets.

16. The system of claim 14, wherein the listing of search results includes one or more segmented regions for each image in the listing of search results, and wherein the user input includes a selection of a segmented region based on a user interaction with the one or more segmented regions, the selection of the a segmented region indicating that an object represented by the segmented region is a positive result.

17. The system of claim 14, wherein the instructions further cause the one or more processors to:

obtain session log data associated with one or more users from a session log; determine one or more search queries from the session log data; determine one or more refinement queries for each of the one or more search queries;

provide the one or more refinement queries to the query refinement data structure;

extract a predetermined number of search queries from the session log data, wherein each of the predetermined number of search queries includes a query interaction frequency that exceeds a query popularity threshold;

determine a predetermined number of images from the image collection for each of the predetermined number of search queries, wherein each image from the predetermined number of images includes an image interaction frequency that exceeds an image popularity threshold; and determine salient objects in each image of the predetermined number of images.

18. The system of claim 14, wherein the instructions further cause the one or more processors to:

obtain query terms and query refinement terms from the query refinement data structure;

compile a listing of unique pairings of query terms and query refinement terms;

determine the predetermined number of top search results for each pairing;

run a forward pass through a trained convolutional neural network to determine convolution image vectors of the predetermined number of top search results for each pairing;

calculate an average of all vectors for each given query refinement term; and compile a listing of the average of all vectors for each given pairing.

19. The system of claim 18, wherein the instructions further cause the one or more processors to:

determine a listing of search results containing images with facets associated with the listing of query refinement terms;

receive a user input indicating selection of one or more facets for an image in the listing of search results;

run a forward pass through the trained convolutional neural network to determine a convolution image vector of each image in the listing of search results associated with the one or more facets;

calculate an average vector of all images associated with the one or more facets;

generate a combined average vector using the average vector of all images and multiple average vectors from the listing of the average vectors associated with the one or more query terms and facet term pairings; and generate a second search query using the combined average vector.

20. A computer-implemented method, comprising: receiving a user input via an application on a client device, the user input indicating a request to initiate an image search;

generating, in response to the user input, an image search query including a first search term from the user input;

providing, for transmission, the image search query over a connection to a server, the server including an image search service that identifies one or more images responsive to the image search query;

receiving a first set of search results based on the image search query, the first set of search results including first images associated with the first search term from a collection of images;

receiving a user interface control with each of the first images, the user interface control providing one or more facets, being identified using object recognition, for the image selected for display based on data from past user session logs, the one or more facets being identified in a prompt to a user to provide a feedback with respect to the image;

providing an indication of the feedback via the user interface control, the feedback including at least one facet; and receiving a second set of search results based on the feedback, the second set of search results selected from a pre-determined number of results including second images associated with a second textual search term based on the one or more facets, the second textual search term being a refinement to the first search term and having a different weighted value than the first search term and comprising a unique pairing of one or more query terms from a prior search query and the one or more facets.

* * * * *